United States Patent [19]

Suzuki et al.

[11] Patent Number: 5,715,448
[45] Date of Patent: Feb. 3, 1998

[54] OPEN DATABASE SYSTEM WHEREIN ACCESS BY SUBSCRIBERS TO A NETWORK IS LIMITED

[75] Inventors: Hiromasa Suzuki, Tokyo; Takeshi Oohashi, Yono; Hitoshi Kawada; Toshihito Kouchi, both of Tokyo, all of Japan

[73] Assignee: Olympus Optical Co., Ltd., Tokyo, Japan

[21] Appl. No.: 56,066

[22] Filed: Apr. 30, 1993

[30] Foreign Application Priority Data

Apr. 30, 1992 [JP] Japan ................. 4-110994
Mar. 17, 1993 [JP] Japan ................. 5-057232

[51] Int. Cl.$^6$ ............................................. G06F 17/30
[52] U.S. Cl. ............... 395/609; 395/610; 395/186; 395/329; 395/218; 395/237; 395/244; 380/49
[58] Field of Search .................. 395/600, 605, 395/609, 610, 218, 237, 244, 329; 364/401, 402, 403, 404, 405, 406, 407, 408, 468; 380/4, 49

[56] References Cited

U.S. PATENT DOCUMENTS

| | | | |
|---|---|---|---|
| 4,799,156 | 1/1989 | Shavit et al. | 395/226 |
| 4,992,940 | 2/1991 | Dworkin | 395/226 |
| 5,036,461 | 7/1991 | Elliott et al. | 395/244 |
| 5,191,522 | 3/1993 | Bosco et al. | 395/206 |
| 5,223,699 | 6/1993 | Flynn et al. | 235/380 |
| 5,237,496 | 8/1993 | Kagami et al. | 395/210 |
| 5,311,438 | 5/1994 | Sellers et al. | 364/468.02 |
| 5,319,542 | 6/1994 | King, Jr. et al. | 395/227 |
| 5,406,475 | 4/1995 | Kouchi et al. | 395/208 |
| 5,410,598 | 4/1995 | Shear | 380/4 |
| 5,504,818 | 4/1996 | Okano | 380/49 |

FOREIGN PATENT DOCUMENTS 4-108133   4/1992   Japan .

*Primary Examiner*—Thomas G. Black
*Assistant Examiner*—Hosain T. Alam
*Attorney, Agent, or Firm*—Frishauf, Holtz, Goodman, Langer & Chick

[57] ABSTRACT

Data of textiles for various types of items offered by a different textile company stored in an integrated database (DR) of a data service company item by item, and data of business results relating to the respective items is also stored therein. Data of business results stored in the integrated DB is renewed based on business data sequentially input from an apparel manufacturer or the textile company. In retrieving textile data from the apparel manufacturer or the textile company, a host computer (integrated database managing system) of data service company retrieves sale data based on the content of the textile in the integrated DB and the content of the business results relating to the content of the textile, and displays the retrieved result on a terminal, which designated the retrieval, that is, a terminal of the apparel manufacturer or a terminal of the textile company. In this case, it is noted that the host computer displays the retrieved result on the terminal (company), which designated the retrieval, in the form of second data in which read data is processed in a case where the terminal, which designated the retrieval, is not a designated enterprise, which is not allowed to refer to retrieved data by the company, which offered the corresponding data.

14 Claims, 19 Drawing Sheets

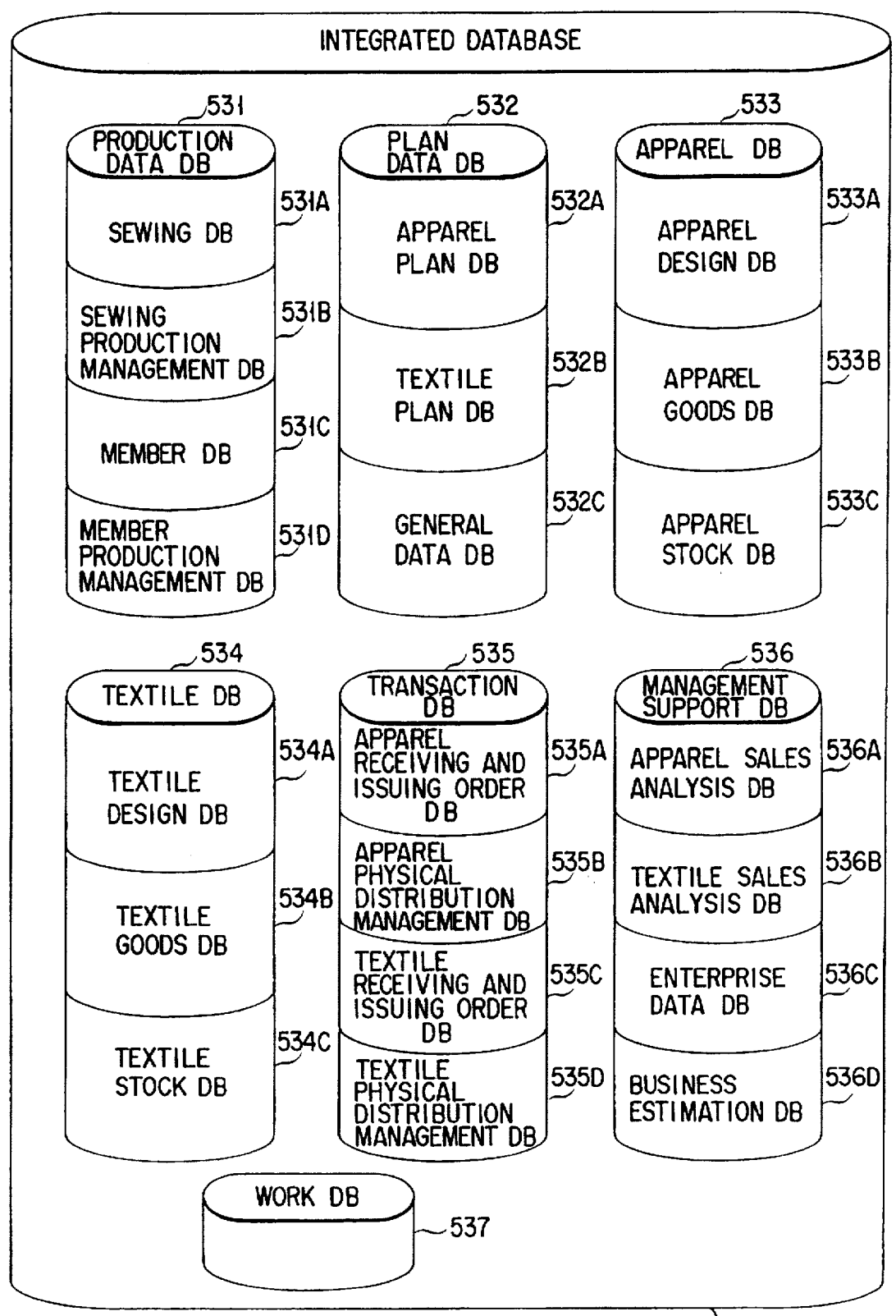
F I G. 4

TEXTILE PLAN DB

| ITEM NUMBER CODE | NECESSARY MATERIAL | PROCESSING STEP | ----- | COMPANY DEALING IN TEXTILE | SECURITY LEVEL |
|---|---|---|---|---|---|
| 1 | | | | | |
| 2 | | | | | |
| ---- | | | | | |

532B

F I G. 5

TEXTILE DESIGN DB

| ITEM NUMBER CODE | IMAGE DATA |
|---|---|
| 1 | |
| 2 | |
| 3 | |
| ---- | |

534A

F I G. 6

TEXTILE GOODS DB

| ITEM NUMBER CODE | SELLING SEASON | TARGET SEASON | COLOR | PATTERN | RAW MATERIAL | TYPE OF WEAVE | CONDITION OF ISSUING ORDER | ----- | COMPANY DEALING IN TEXTILE GOODS |
|---|---|---|---|---|---|---|---|---|---|
| 1 | | | | | | | | | |
| 2 | | | | | | | | | |
| ---- | | | | | | | | | |

TEXTILE RECEIVING AND ISSUING ORDER DB

| ITEM NUMBER CODE | NUMBER OF ISSUING ORDER | NUMBER OF RECEIVING ORDER | NUMBER OF CANCELLATIONS | ----- | SECURITY LEVEL |
|---|---|---|---|---|---|
| 1 | | | | | |
| 2 | | | | | |
| ---- | | | | | |

FIG. 12
| TRANSACTION RESULT | NUMBER OF ISSUING ORDERS | NUMBER OF RECEIVING ORDERS |
|---|---|---|
| | 11,500 | 10,500 |
FIG. 13
TRANSACTION RESULT (NUMBER OF ISSUING ORDER)   LARGE   INTER-MEDIATE   SMALL
FIG. 14
TRANSACTION RESULT (PAST SIX MONTHS) (NUMBER OF ISSUING ORDER) 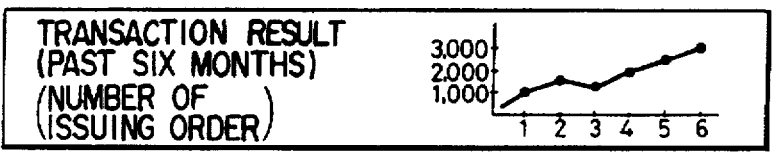
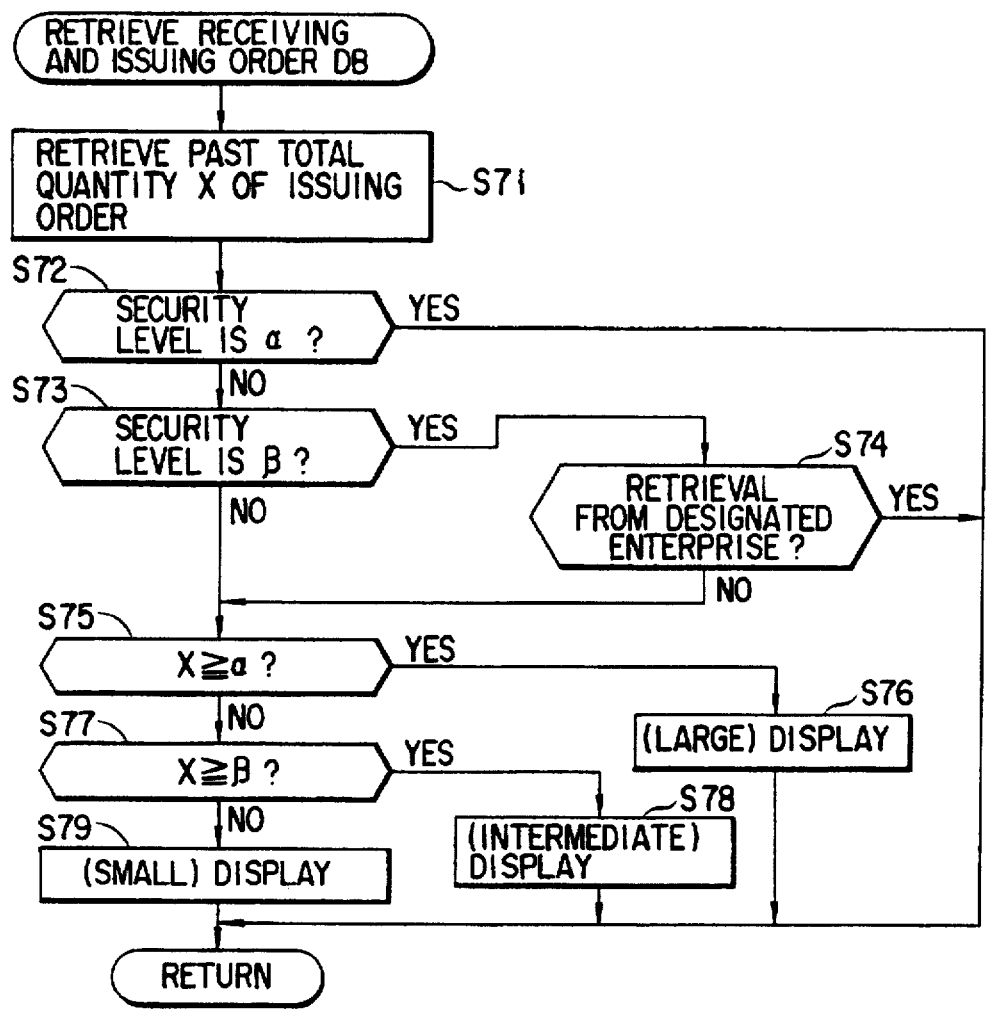
FIG. 15

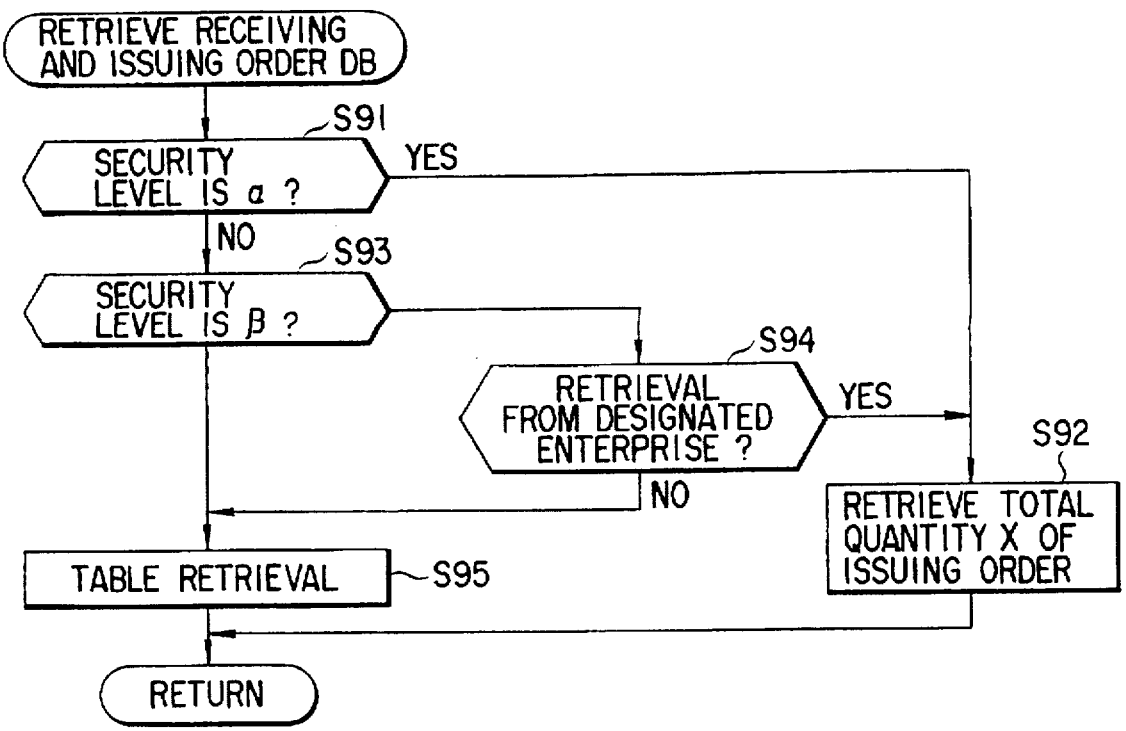
F I G. 17
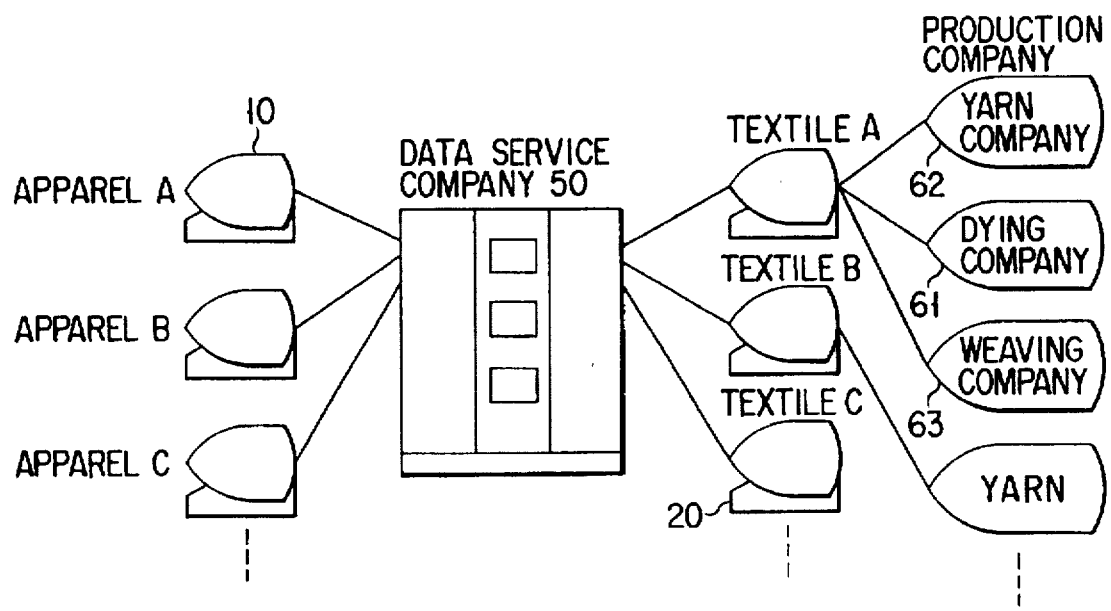
F I G. 18A

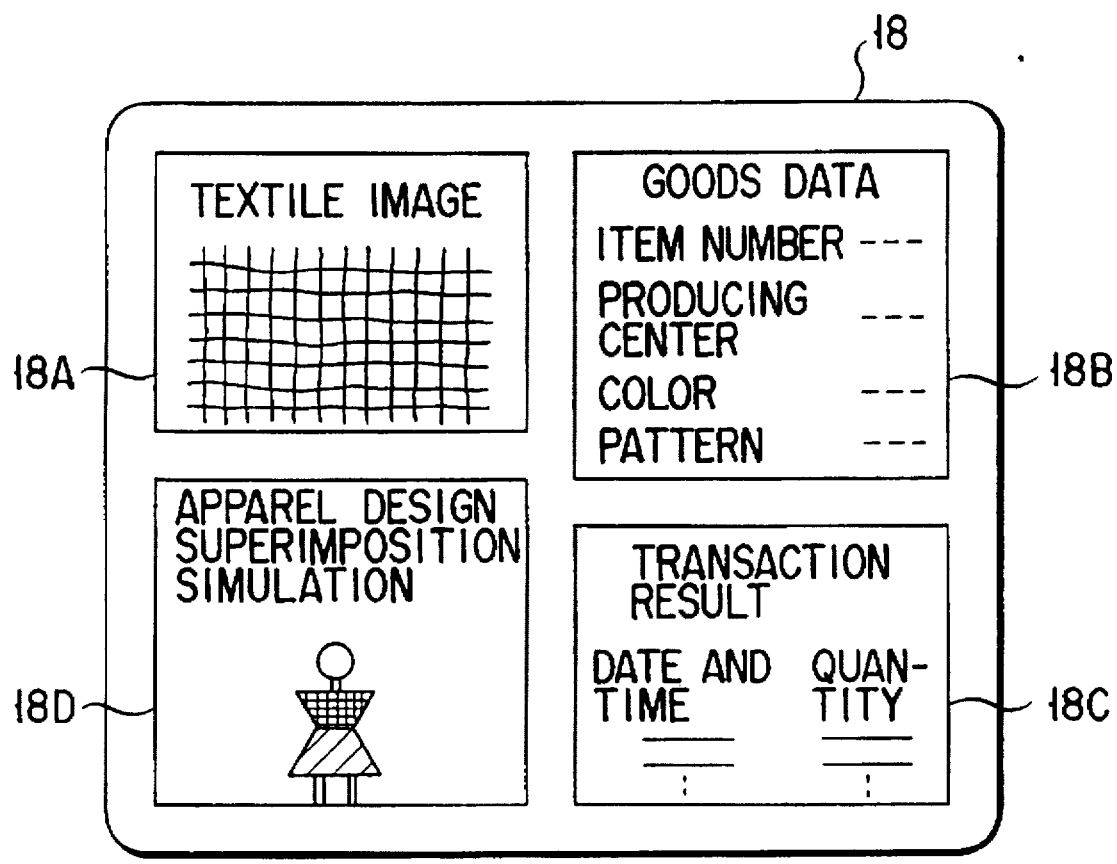
F I G. 19

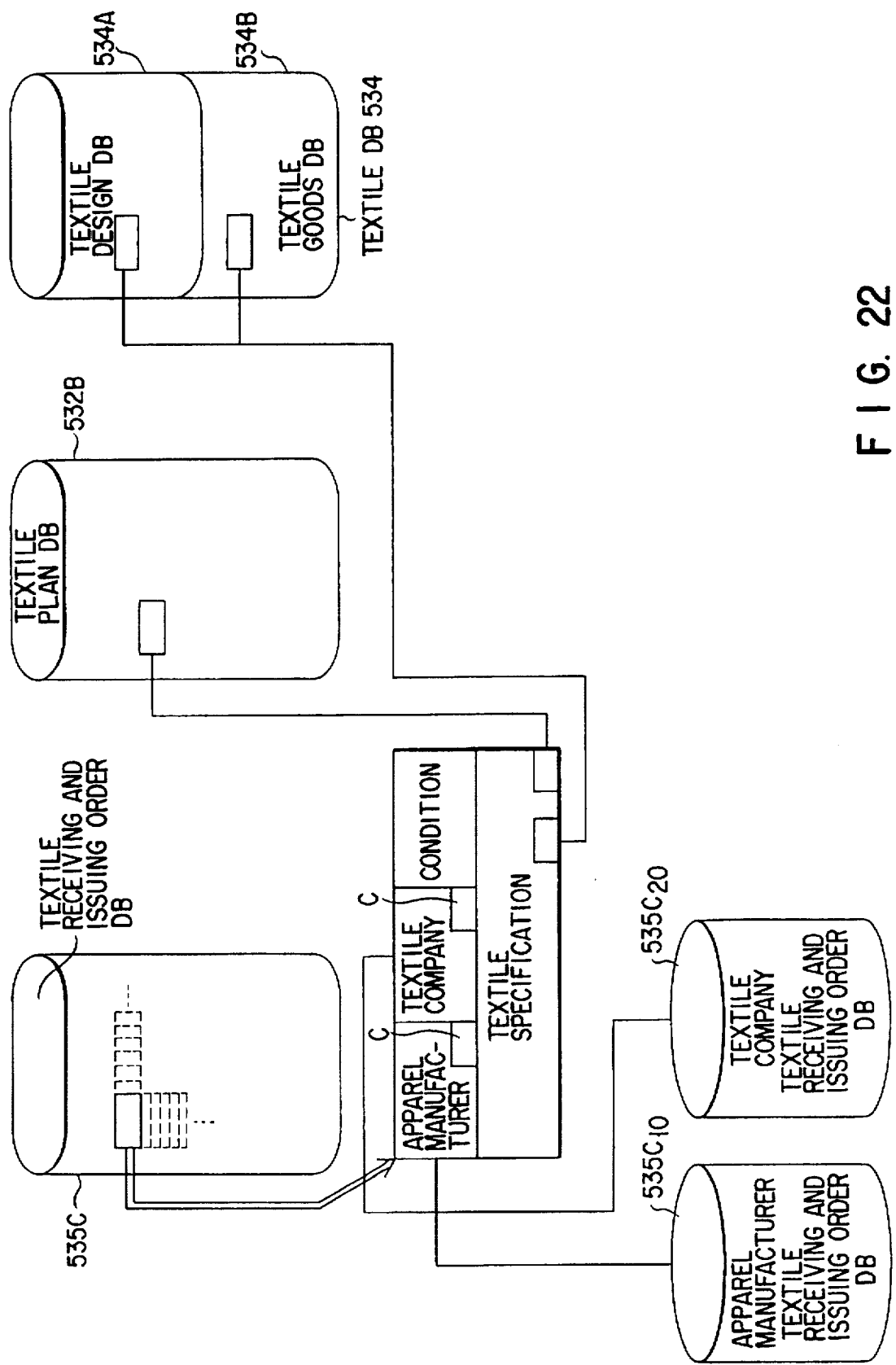
F I G. 22

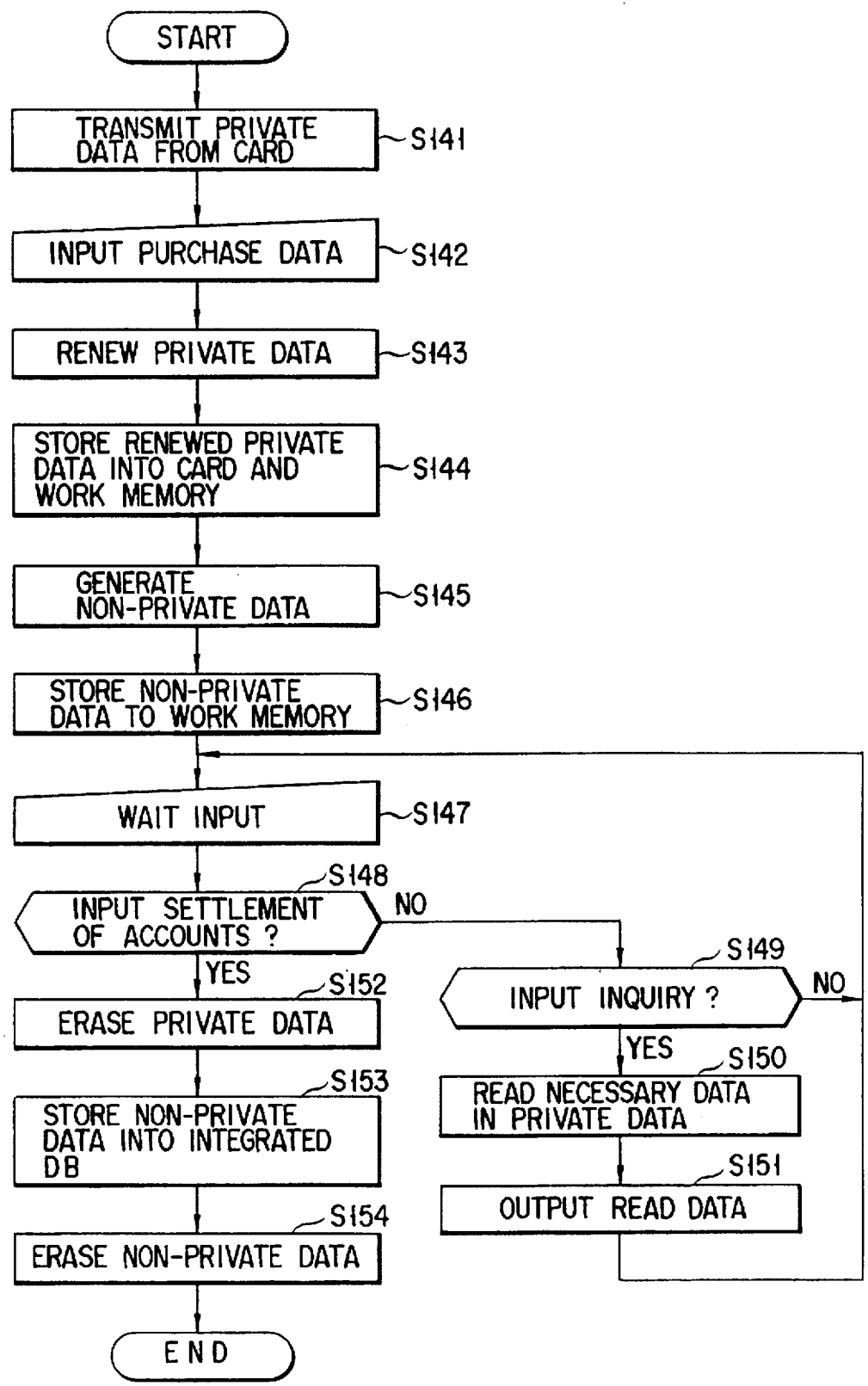
F I G. 25

5,715,448

OPEN DATABASE SYSTEM WHEREIN ACCESS BY SUBSCRIBERS TO A NETWORK IS LIMITED

This application has the following related applications, Ser. No. 08/056,065, now U.S. Pat. No. 5,495,602; Ser. No. 08/056,064; Ser. No. 08/056,057, now U.S. Pat. No. 5,406,475; Ser. No. 08/056,492; all of which filed on Apr. 30, 1993.

BACKGROUND OF THE INVENTION

1. Field of the Invention

The present invention relates to a data managing apparatus for an open system in which unspecified subscribers such as apparel manufacturers and textile companies look up various databases of their companies and the other companies in their transaction of business.

2. Description of the Related Art

Conventionally, in the plan and production of textiles for high-quality woman's dresses, which are produced in many types of items and a small quantity, the apparel manufacturer, who plans and manufactures the dresses, and the textile company having a business relation with the apparel manufacturer counsel with each other about what textile matches with the dress planned by the apparel manufacturer and what quantity of such dresses are sold. In this case, they normally decide the textile and the quantity of dresses based on their ready insight and experience. Or, the textile companies themselves plan the textile to be sold well in consideration of the latest trend in clothes and the other factors, estimated the quantity of dresses, and carried out the production.

As mentioned above, in the plan and production of textiles, they normally decide the textile and the quantity of dresses based on their ready insight and experience.

However, the design and textile are largely influenced by the latest trend in clothes, and there frequently occur cases in which their estimated quantity of dresses, which they design, is not sold as they planned. Due to this, the produced items were frequently wasted. Particularly, such a tendency can be strongly shown in the production of the high-quality woman's dresses since the circulation of the high-quality woman's dresses is short.

On the contrary, the certain types of dresses were selling well, and the textiles were often in short supply. Due to this, there often occurred a problem in that the dresses, which are still selling well, cannot be manufactured.

In other words, in the conventional plan and the method of manufacturing the textiles, which largely depend on the person's ready insight and experience, there often occurred the problem in that the textiles are often left unsold in the textile companies, and that the additional manufacture of the dresses, which are selling well, cannot be made due to the shortage of the textiles in the apparel manufacturers.

In order that the various types of items and the small quantity of production, and the repeated order can be performed based on data, there has been desired an open system in which the network between the plurality of apparel manufacturers and the plurality of textile companies, and the network between the sewing companies, which are the relating companies of the apparel manufacturers, and the sales companies can be constructed, and not only the database of the self-company but also that of the other companies can be mutually used.

In such an open system, it is important to prevent secret data from being leaked to the other companies (other subscribers).

SUMMARY OF THE INVENTION

In consideration of the above-mentioned problem, the present invention has been made, and an object of the present invention is to provide an open system in which unspecified subscribers join and secret data of a specified subscriber does not leak.

According to a first aspect of the invention, there is provided an open system comprising database means in which data offered by a large number of subscribers is stored, access means for accessing the database means by each subscriber, subscriber specifying means for specifying a subscriber trying to access the database by the access means, access range limiting means for limiting an access range of the database means due to the access means based on the subscriber specified by the subscriber specifying means, and changing means for changing the way of displaying data sent from the database means accessed by the access means in accordance with the subscriber specified by the subscriber specifying means.

According to a second aspect of the invention, there is provided an open system comprising database means in which data offered by a large number of subscribers is stored, second data generating means for generating second data whose data source cannot be specified and which is available to all subscribers by processing data offered by the large number of subscribers, and for storing the second data in the database, and access means for accessing the second data stored in the database means by each subscriber.

According to a third aspect of the invention, there is provided an open system comprising database means in which data offered by a large number of subscribers is stored, private data storing means for receiving data from any one of subscribers, and for temporarily storing the received data in the database means as private data, non-private data storing means for generating non-private data in which data specifying the subscriber is deleted from the private data, and for storing non-private data in the database means, access means for providing access to the database means by each subscriber, subscriber specifying means for specifying a subscriber trying to obtain access to the database means by the access means, deadline managing means for managing a predetermined deadline, subscriber limiting means for limiting a subscriber who can obtain access to the private data stored in the database means by the access means based on the subscriber specified by the subscriber specifying means before the predetermined deadline managed by the deadline managing means, and private data erasing means for erasing the private data stored in the database means at the time of passing the predetermined deadline managed by the deadline managing means.

According to a fourth aspect of the invention, there is provided a data managing method for an open system, comprising the steps of: specifying a subscriber to access when each subscriber accesses a database means registering data offered by a large member of subscribers; limiting an access range of the database means based on the specified subscriber; and changing the way of displaying data sent from the database means accessed by the access means in accordance with the specified subscriber.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a view showing the structure of an integrated database;

FIG. 5 is a view showing the structure of a database of textile plan;

FIG. 6 is a view showing the structure of a database of textile design;

FIG. 7 is a view showing the structure of a database of a textile goods;

FIG. 8 is a view showing the structure of database of an order received and an order issued by textiles;

FIGS. 12 to 14 are views showing the examples of the display of business results, respectively;

FIG. 15 is a detailed flow chart showing a retrieval processing of a database of an order received and an order issued by textiles in step S26 of FIG. 10 to perform the display of FIG. 13;

FIG. 17 is a detailed flow chart showing a retrieval processing of database of an order received and an order issued by textiles in step S26 of FIG. 10 to perform the display of FIG. 14;

FIGS. 18A and 18B are a general view showing the structure of a second embodiment and the structure of each company, respectively;

FIG. 19 is a view showing a display state when an apparel manufacturer retrieves data according to the second embodiment;

FIG. 22 is a view showing the structure of a database in a case where the database of an order received and an order issued by textiles of the data service company has no real data;

FIG. 25 is a flow chart explaining an operation of a third embodiment of the present invention in a case that an individual consumer as a subscriber purchases a dress at a certain shop.

DETAILED DESCRIPTION OF THE PREFERRED EMBODIMENTS

Embodiments of the present invention will be explained with reference to the drawings.

Figure 1:
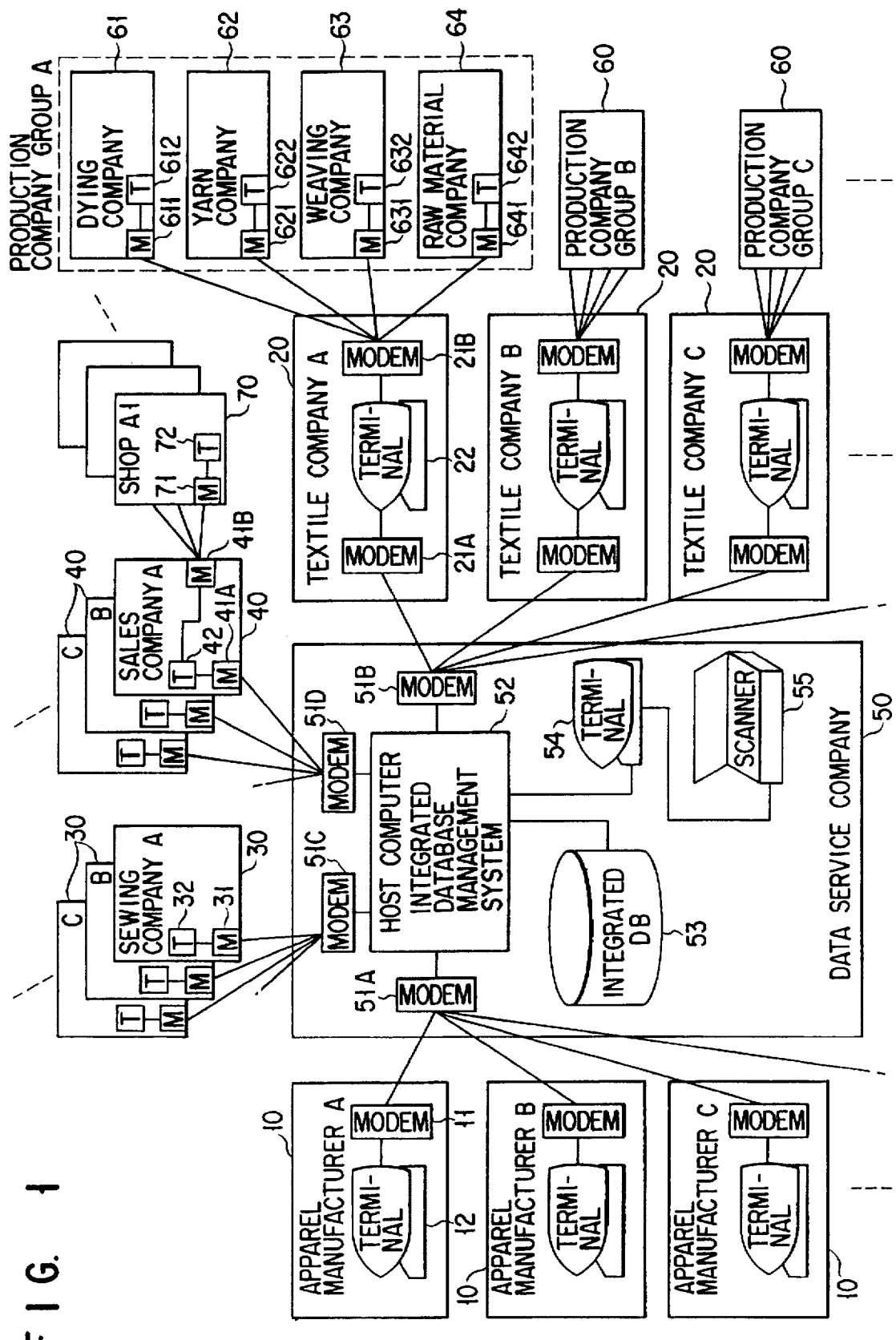
FIG. 1 is a view showing a first embodiment of the present invention.

FIG. 1 is a view showing a first embodiment of the present invention. In FIG. 1, a data service company 50 is distributed among a plurality of apparel manufacturers (A, B, C, ...) 10, a plurality of textile companies (A, B, C, ...) 20, a plurality of sewing companies (A, B, C, ...) 30, and a plurality of sales companies (A, B, C, ...) 40, thereby a data offering service network is expanded.

In the data service company 50, there is provided a host computer (integrated database managing system) 52, which is connected to the apparel manufacturers 10, the textile companies 20, sewing companies 30, and sales companies 40 through a public telephone line by use of modems 51A, 51B, 51C, and 51D. An integrated database (DB) 53 to be detailed later, and a work station level terminal 54 including a keyboard, a high resolution display, and a printer, are connected to the host computer 52. Also, a scanner 55 is connected to the terminal 54.

Figure 2:
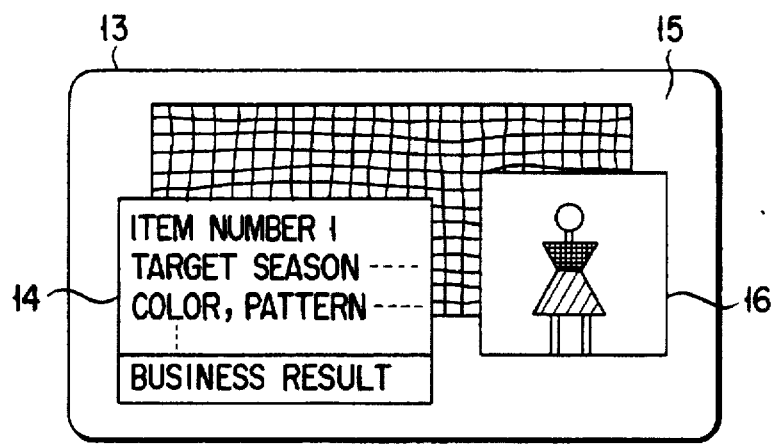
FIG. 2 is a view showing a display state when an apparel manufacturer retrieves data according to the first embodiment.

Each apparel manufacturer 10 has a data terminal 12 connected to the host computer 52 of the data service company 50 by a modem 11. The terminal 12 is a work station level terminal including a keyboard, a high resolution display, and a printer. For example, as shown in FIG. 2, goods data is displayed on a display screen 13 by characters, and image data of a textile can be displayed thereon. Also, a superimposing process can be performed so as to match a design of a dress prepared by a design CAD.

Each textile company 20 plans the textile and instructs the production of the textile. Then, similar to the apparel manufacturers 10, in the textile company 20, there is provided a terminal 22, which is connected to the host computer 52 of the data service company 50 through the public telephone line by use of a modem 21A. In the terminal 22, the superimposing process cannot be performed unlike the terminal 12 of the apparel company 10, however, a change of a design of the textile, and the preparation of the textile can be performed.

Moreover, each textile company 20 has production company groups (A, B, C, ...) 60, as their subsidiary companies, including a textile dying company 61, a yarn company 62, a weaving company 63, a textile raw material company 64, which are connected to each textile company 20 through the public telephone line by use of a modem 21B, and actually carry out the production of the textiles. The respective companies 61, 62, 63, 64 have modems 611, 621, 631, 641 and terminals 612, 622, 632, 642. The textile companies 20 transmit instruction of production to these production companies online, whereby a real production is carried out. In the figure, one company of each type of the production companies 61 to 64 is typically shown. However, in actual, each type of the production companies 61 to 64 often includes a plurality of companies.

Similarly, there is provided a terminal 32, which is connected to the host computer 52 of the data service company 50 through the public telephone line by use of a modem 31 in each of sewing companies 30. Also, there is provided a terminal 42, which is connected to the host computer 52 of the data service company 50 through the public telephone line by use of a modem 41A in each of sales companies 40. Moreover, each sales company 40 has shops 70, which actually sell dresses, as a subsidiary. Each shop also has a modem 71 and a terminal 70, so that sales can be transmitted to the sales company online. In other words, in this case, the terminal 72 of each shop 70 has a POS terminal function.

Figure 3:
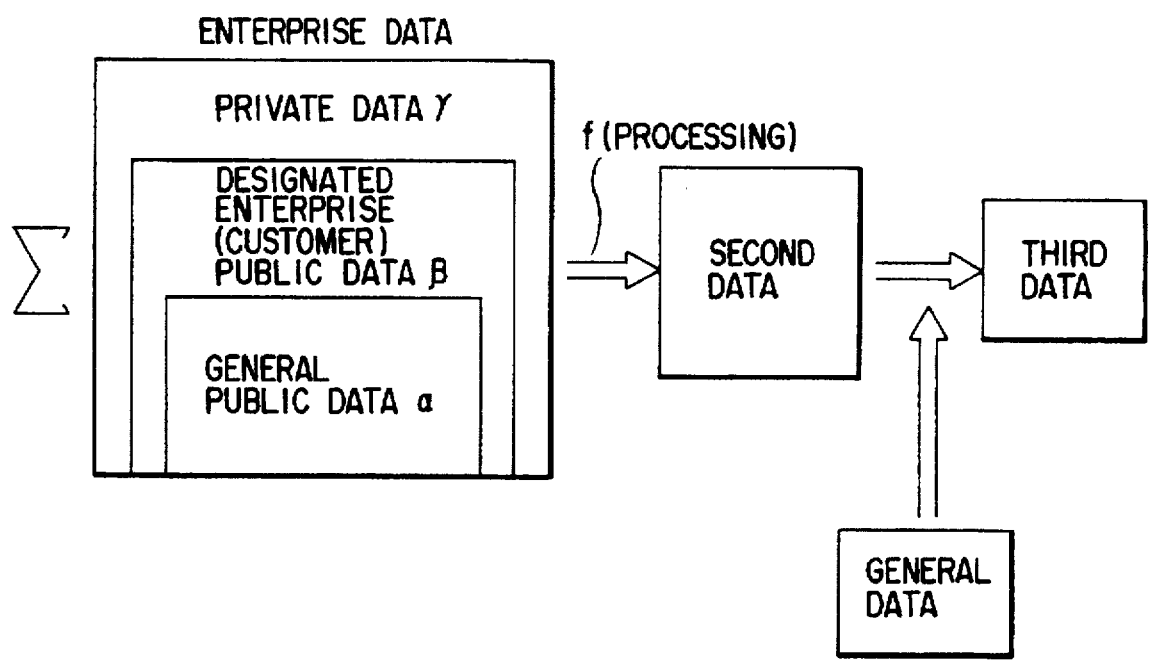
FIG. 3 is a view showing the outline of data processing by a data service company.

As shown in FIG. 3, the data service company 50 collects enterprise data of each of the apparel manufacturers 10, the textile companies 20, sewing companies 30, sales companies 40, and, depending on the case, production company groups 60 and shops 70 in the network constructed among these companies. Then, the data service company 50 processes data to be converted to second data, and adds general data (e.g., weather forecast, etc.) to the second data to be converted to third data. In this case, enterprise data can be classified into general public data (α), designated enterprise (coustomer) public data (β), and subscriber private data (γ). General public data (α) is data whose public offering of data can be recognized by a company, which is a data source. Designated enterprise public data (β) is data, which may be open to public to only companies having a business transaction with the company, which is the data source. Private data (γ) is private data of the company which cannot be leaked to the other companies. Therefore, when the data service company 50 offers enterprise data (first data) to each company (subscriber), it is needed that the range of data available be managed or data security be maintained. In this embodiment, there is used a method in which a subscriber is specified by an ID and a password to maintain security. Or, there may be used a method in which data is offered in the form of second or third data whose source is made unclear without offering raw data.

The data service company 50 offers the following services:

1. Data servicing for Apparel Manufacturers (1) Sales result of self-company: a transaction result counted at real time;

(2) Entire sales result of the apparel manufacturers in the network: data of sales (including transactions) result counted by the network;

(3) Entire sales result of the sales related companies in the network: data of sales counted by the terminal (POS terminal) 72 of each shop 70;

(4) Trend data: Trend data in domestic and overseas;

(5) Data of production companies in the network: introduction data of the business and goods of the production companies participated in the network; and (6) General market and shop front research Particularly, security of above services (1), (2), and (3) is needed.

2. Data servicing for sales related companies (1) Sales result of self-company: a transaction result counted at real time by the terminal (POS terminal) 72 of each shop 70 belonging to the self-company;

(2) Entire sales result of the sales related companies in the network: sales data counted by the terminal (POS terminal) 72 of each shop 70 in the network;

(3) Trend data: Trend data in domestic and overseas;

(4) General market and shop front research; and (5) Introduction of the apparel manufacturers in the network: introduction data of the goods of the apparel manufacturers participating in the network and brand names.

Particularly, security of above services (1) and (2) is needed.

3. Data servicing for textile plan (1) General data: data of other than the fashion such as politics, economy, culture and customs, weather, environment, etc.;

(2) Trend data in cloths: technical data of color, textile, and style;

(3) Consumer data: data of customers;

(4) Market data: market data of other than consumer data;

(5) Data of sales result: sales data of self-company and other companies; and (6) Other data.

Particularly, security of above services (3), (4), and (5) is needed.

As shown in FIG. 4, the integrated database (DB) 53 of the data service company 50 available for obtaining the above-mentioned services comprises a production data DB 531, a plan data DB 532, an apparel DB 533, a textile DB 534, a transaction DB 535, a management support DB 536, and a work DB 537.

The production data DB 531 comprises a sewing DB 531A, a sewing production management DB 531B, a member DB 531C, and a member production management DB 531D. The sewing DB 531A is a database in which various data of product processes of manufacturing dresses is stored. The sewing production management DB 531B is a database in which data of a working load sate of each sewing company is stored. The member DB 531C is a database in which various processing data necessary for manufacturing textiles is stored. The member production management DB 531D is a database in which data of a process load state of each of the production companies such as the yarn company, dying company, sewing company is stored. It is noted that other various data relating to the manufacturing process of sub-materials such as buttons, ribbons, etc., dyestuffs, process ability, and the like is stored in the production data DB 531.

The plan data DB 532 comprises an apparel plan DB 532A, a textile plan DB 532B, and a general data DB 532C. The apparel plan DB 532A is a database in which necessary data for planing and manufacturing the apparel is stored.

The textile plan DB 532B is a database in which necessary data for planning and manufacturing textiles is stored. For example, as shown in FIG. 5, data necessary for producing the textiles such as a goods code, necessary material, processing step, company dealing in textiles, security level, and the like, is stored in the textile plan DB 532B. In this case, the security level is data showing the classification of general public data (α), designated enterprise public data (β), and subscriber private data (γ). Therefore, if designated enterprise public data (β) is set, data for specifying the designated subscriber is of course recorded. The textile company 20 makes the production plan based on data retrieved from the textile plan DB 532B, and instructs the production company group 40 of their subsidiary to start the production of the textile.

The general data DB 532C is a database in which various types of data of the daily life such as life style, moves, the mass media, that is, data not directly concerning to the dresses and textiles, is stored. In the general data DB 532C, there is also stored general data such as a stock market, movement of exchange, the production of silk in a foreign producing center, the production of wool and the like.

The apparel DB 533 comprises an apparel design DB 533A, an apparel goods DB 533B, an apparel stock DB 533C. The apparel DB 533 is a database, which is expanded in more detail to concentrate on the manufacture of the dresses. The apparel design DB 533A is a database in which design data of what dress is designed is stored. The apparel goods DB 533B is a database in which data relating to the production and sales of goods is stored. In this case, it is the goods, that is, the dresses, which are actually manufactured, exhibited to be on sale in other words, the dresses, which are designed from the designs stored in the apparel design DB 533A, and produced on a commercial basis. That is, it is the goods to which a goods code is added to be ready to be on sale. The above-mentioned includes data of what dress is designed, what textile is used, and what sewing process is carried out. The apparel stock DB 533C is a database in which goods in stock are stored. In this case, goods in stock include the stock, which the sales company 40 or apparel manufacture 10 has, and goods in process, which the sewing company 30 has.

Regarding data of these apparel goods DB 533B and apparel stock DB 533C, similar to the textile plan DB 532B, the access of each subscriber is needed to be limited in accordance with the security level. That is, it is needed that the security is fully considered and that the necessary data is obtained. For example, an ID number of the company is used as a key, and the security must be maintained based on the individual data of the company relating to what business transaction the company has.

The textile DB 534 is a database, which is expanded in more detail to concentrate on the manufacture of the textiles. The textile DB 534 comprises a textile design DB 534A, a textile goods DB 534B, and a textile stock DB 534C. The textile design DB 534A is a database in which design data of what pattern of textile is manufactured is stored. For example, as shown in FIG. 6, the textile DB 534A stores an item code and static image data of the textile are stored item by item of the registered textiles. The textile goods DB 534B is a database in which various data necessary for manufacturing the textile for goods, such as a price, a production result, etc. is stored. More specifically, as shown in FIG. 7, the textile goods DB 534B stores an item code and data relating to the textile such as a selling period, target season, color, pattern, raw material, type of weaving, condition of order, standard price, company dealing in the textile, etc., item by item as character data. The textile stock DB 534C is a database storing data of the stock of the textile company 20, and goods in process of each of the textile dying company 61, yarn company 62, weaving company 63, and the stock of the apparel manufacturer 10. Similar to the apparel stock DB 533C, it is needed that necessary data is fetched from the ID number and the record of the mutual business relation in the range, which does not deviate from the security level, in accordance with the security set item by item.

The transaction DB 535 carries out a due date management and an electronic settlement of accounts. The transaction DB 535 comprises an apparel receiving and issuing order DB 535A, an apparel physical distribution management DB 535B, a textile receiving and issuing order DB 535C, and a textile physical distribution management DB 535D. The apparel receiving and issuing order DB 535A is a database in which transaction history data of the apparel is stored. The textile receiving and issuing order DB 535C is a database in which transaction history data of the textile is stored. As shown in FIG. 8, the textile receiving and issuing order DB 535C sequentially inputs and renews the quantity of the textiles every time when the order is received and issued or canceled every item code. Also, the security level relating to business result data of the textile is recorded therein.

The management support DB 536 is used to serve second data, which is various types of data necessary for the actual management plan or management decision, and which is obtained by processing various types of databases, and process data, that is, third data, which the data service company 50 analyses in their own analysis method, in other words, data whose source becomes unclear. The management support DB 536 comprises an apparel sales analysis DB 536A, a textile sales analysis DB 536B, an enterprise data DB 536C, and a business estimation DB 536D. The apparel sales analysis DB 536A is a database storing data of which the sales of the apparel is analyzed. The textile sales analysis DB 536B is a database storing of which the sales of the textile is analyzed. The enterprise data DB 536C is a database storing data of the business state of each enterprise and the transaction state.

The work DB 537 is a database to be used as a work memory for temporarily storing various data, which is necessary when the host computer 52 (integrated database management system) executes various processes.

Figure 9:
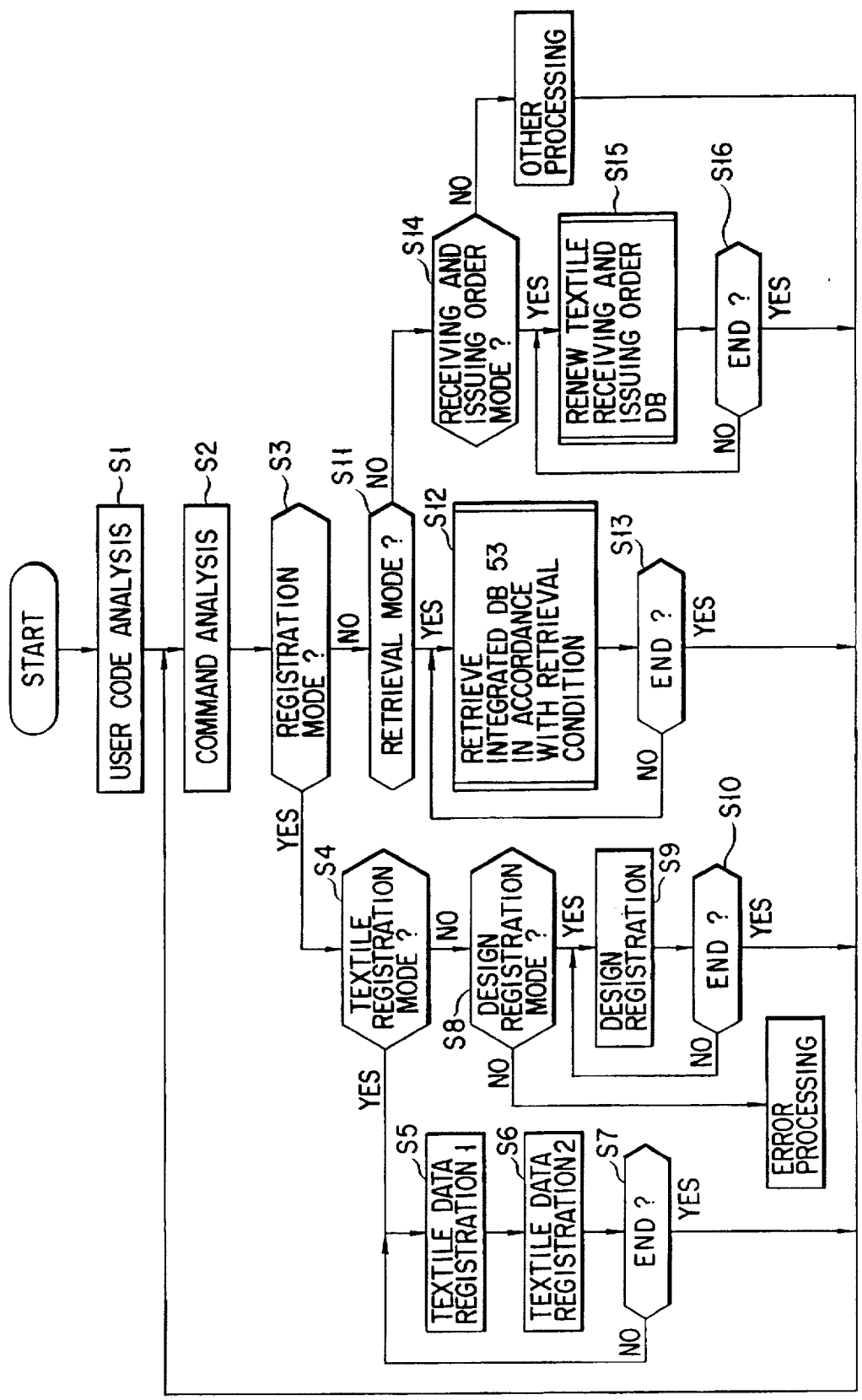
FIG. 9 is a flow chart showing a data processing by a host computer of the data service company.

An operation concerned with the textile will be explained as follows. FIG. 9 is a flow chart showing a data processing by the host computer 52 of the data service company 50.

When the host computer 52 receives the user code (ID number), which is used for discriminating the terminal, from the terminal 54, the terminal 12 of the apparel manufacturer 10 via modems 51A to 51D, the terminal 22 of the textile company 20, the terminal 32 of the sewing company 30, or the terminal 42 of the sales company, the user code is analyzed to discriminate which company (subscriber) tries to access to the database (step S1).

Thereafter, when a command is inputted from the discriminated terminal, the host computer 52 analyzes the content of the command (step S2). As a result of the analysis, if the content is a registration mode inputted the input terminal 54 of the host computer 52 (step S3) and a textile data registration mode (step S4), the registration mode is discriminated as a textile data registration mode. Then, data of the database of the outer unit is directly registered in the textile plan 532B and the textile goods DB 534B of the integrated database DB 53 or arranged so as to adjust the data format of the data service company and registered therein (step S5). Or, the textile data of a textile which is planned by the textile company 20 and manufactured as a sample are input from the terminal 54, and the sample is read by scanner 55 and input as image data, and registered in the textile design DB 534A of the integrated database DB 53 (step S6). In steps S5 and S6, the necessary security level and the designation of the enterprise, which depends on the case, are set.

If all restoration processing are finished (step S7), the operation returns to step S2, and a next command analysis is carried out.

If the analyzed content of the command is not the textile registration mode of the textile but design registration mode (step S8), data of the outer database or the design image of the dress planned and designed by the apparel manufacturer 10 are registered in the apparel design DB 535A and the apparel goods DB 533B of the integrated database DB 53 (step S9). If all registration processings are finished (step S10), the operation returns to step S2, and a next command analysis is carried out.

If the operation is a retrieval mode (step S11), the host computer 52 retrieves the integrated database DB 53 in accordance with the retrieval condition in response to the request from the apparel manufacturer 10 or the textile company 20 (step S12), and the result is transmitted to each company. The details of the retrieval processing will be explained later. If all registration processings are finished (step S13), the operation returns to step S2, and a next command analysis is carried out.

At the time of retrieval, goods data of the textile, which satisfies the retrieval condition, business transaction data (by which the state of sales can be confirmed), and the image of the textile as required can be seen through the terminal 12 of the apparel manufacturer 10 and the terminal 22 of the textile company 20.

For example, the apparel manufacturer 10 reads design data registered in the apparel design DB 533A of the integrated database DB 53 of the data service company 50 through the terminal 11, and design data is displayed in a window 16 shown in FIG. 2. Based on this display, the correction of the design, and the change are carried out. Moreover, in order to select the textile matching with the design, a retrieval condition is input, and the retrieval is carried out from the textile goods DB 534B of the integrated database 53. The actual image data is fetched from some 'selected textiles by the textile design DB 534A, and displayed on the window as an image. In this case, transaction result data retrieved from the textile receiving and issuing order DB 535C is also displayed on a window 14. Then, if the displayed data is Yes, issuing order is performed (that is, the operation goes to the receiving and issuing mode).

If it is discriminated that the operation is a receiving and issuing order mode by the request of the order issued by the apparel manufacturer 10 (step S14), the content of the textile receiving and issuing order DB 535C is renewed based on the issuing data (quantity of issued orders) (step S15). If all receiving and issuing order processings are finished (step S16), the operation returns to step S2, and a next command analysis is carried out.

Since the textile companies know the item number of the textile ordered, they can obtain detailed processing data by providing access to the textile plan DB 532B of the item number. Then, the textile company plans the production based on the processing data, and transmits production instructing data and processing data to each of the production companies 61 to 64. Each production company carries out the production based on the production instructing data.

Figure 10A:
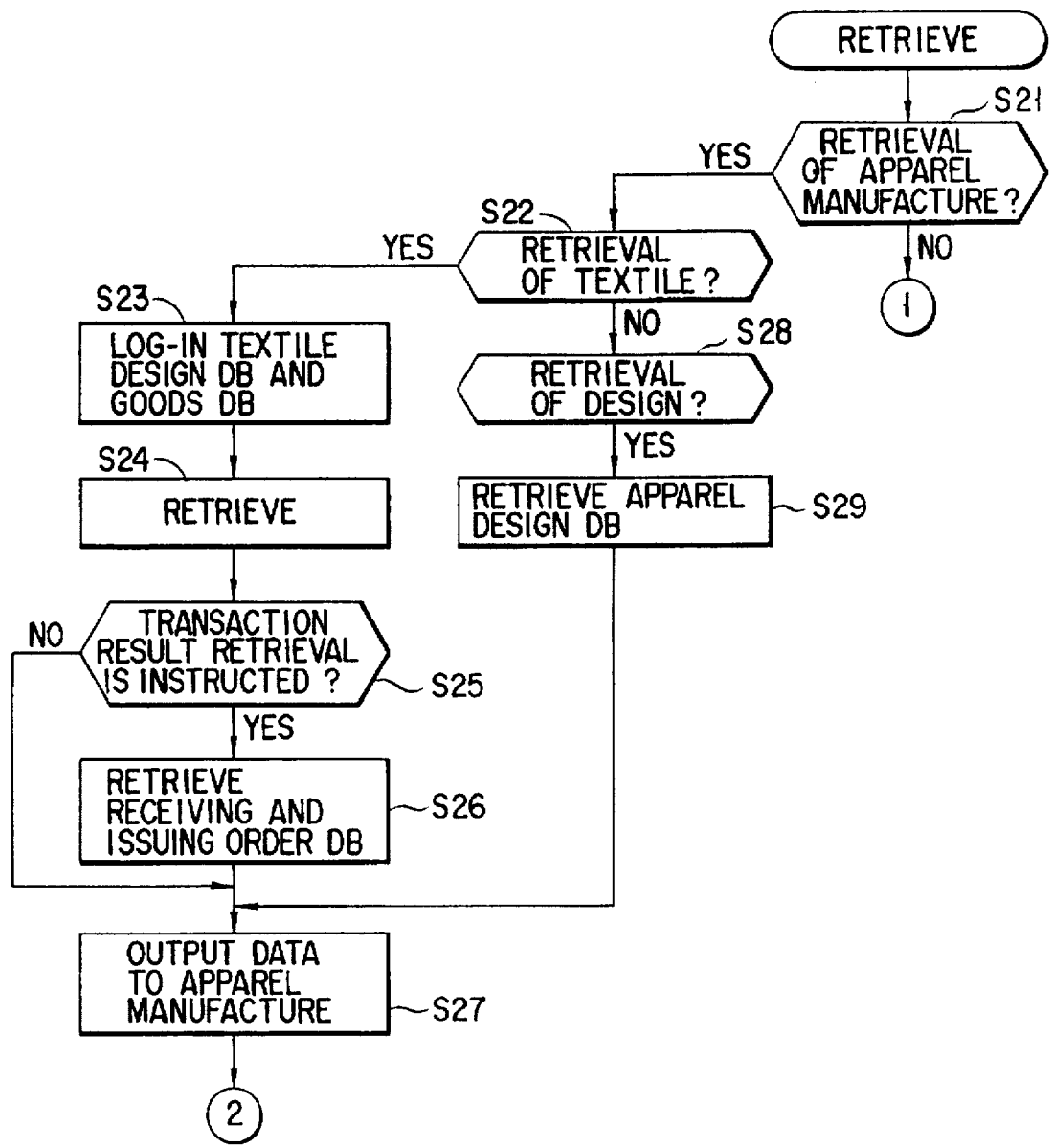
FIGS. 10A and 10B are a detailed flow chart showing a retrieval processing in step 12 of FIG. 9.
Figure 10B:
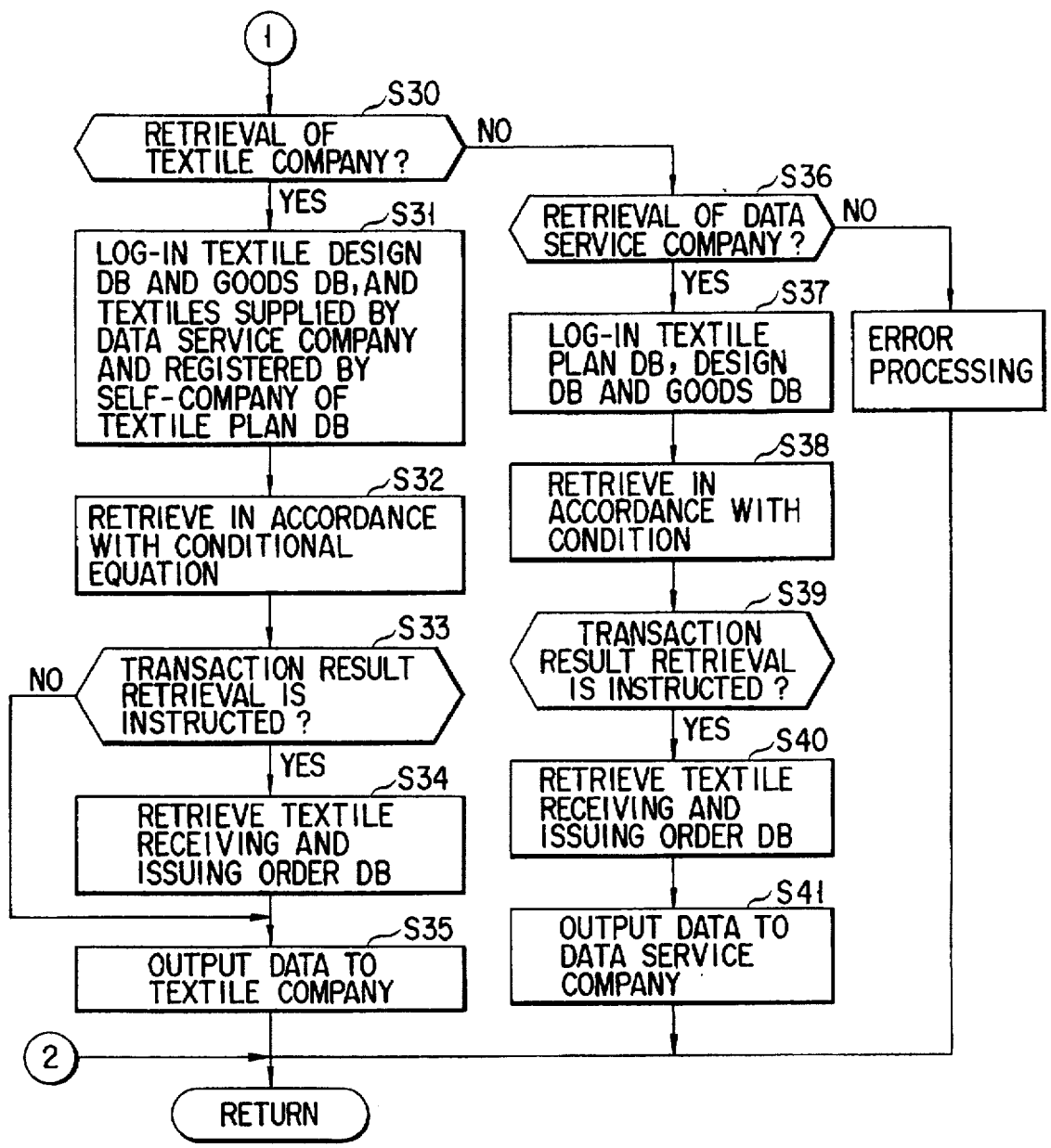

The retrieval process of step S12 is carried out as shown in the flow chart of FIGS. 10A and 10B.

In other words, if the operation is the textile retrieval from the apparel manufacturer 10 (steps S21, S22), the host computer can access (log-in) only to the textile design DB 534A and the textile goods DB 534B (step S23), and the retrieval is carried out (step S24). If the retrieval of the transaction result is also instructed (step S25), the textile receiving and issuing DB 535C is retrieved (step S26), and the result of the retrieval is output to the apparel manufacturer 10 (step S27).

Also, if the operation is the design retrieval from the apparel manufacturer 10 (step S28), the apparel design DB 533A is retrieved (step S29), and the retrieval result is output to the apparel manufacturer 10 (step S27).

Moreover, if the operation is the retrieval from the textile company 20 (step S30), the host computer can access (log-in) only to the textile as general public data and the textile registered in the textile company 20 in the textile plan DB 532B in addition to the textile design DB 534A and textile goods DB 534B (step S31), and the retrieval is carried out (step S32). If the retrieval of the transaction result is also instructed (step S33), the textile receiving and issuing DB 535C is retrieved (step S34), and the result of the retrieval is output to the textile company 20 (step S35).

Also, if the operation is the retrieval from the data service company 50 (step S36), the host computer can access (log-in) to the textile plan DB 532B, textile design DB 534A, and the textile goods DB 534B (step S37) and the retrieval is carried out (step S38). If the retrieval of the transaction result is also instructed (step S39), the textile receiving and issuing DB 535C is retrieved (step S40), and the result of the retrieval is output to the terminal 54 of the data service company 50 (step S41).

As mentioned above, the retrieval range of the integrated database DB 53 is made different by depending on which company (subscriber) carries out the data retrieval, so that leakage of important data (private data γ such as processing data) to the other competitive companies is prevented.

Figure 11:
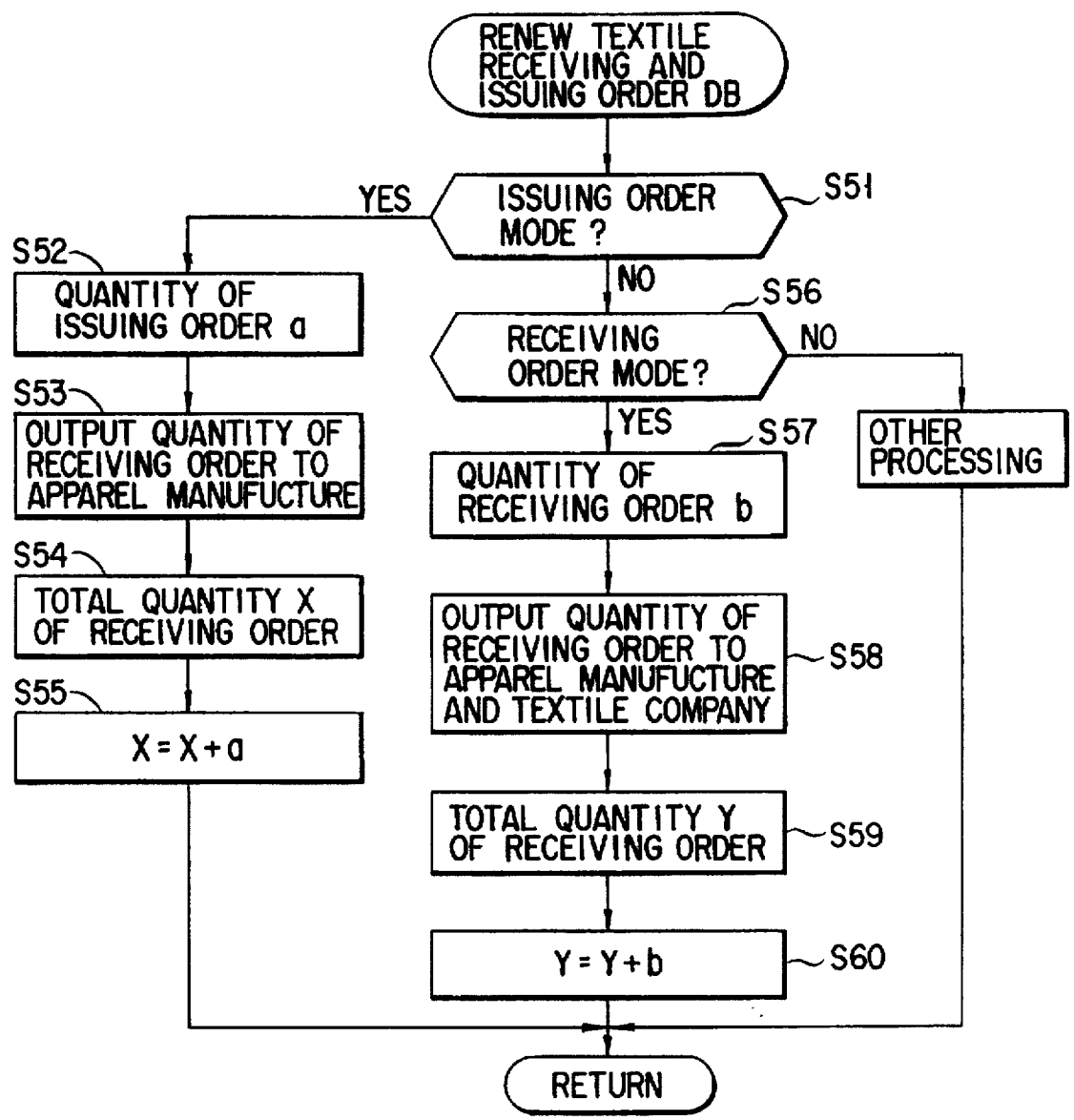
FIG. 11 is a detailed flow chart showing a renewal processing of database of an order received and an order issued by textiles in step 15 of FIG. 9.

The renewal process of the textile receiving and issuing order DB 535C in step S15 is carried out as shown in FIG. 11.

That is, if the operation is the issuing order mode (step S51), a quantity of issuing order a is received (step S52), and output to the apparel manufacturer 10, which is the origin of the issue, for confirmation (step S53). Then, a total quantity X of issuing order of the textile is read from the textile receiving and issuing order DB 535C (step S54). Next, the issuing order a is added to the total quantity X, the result is used as a new total quantity X of issue order, and the textile receiving and issuing order DB 535C is renewed (step S55).

If the operation is the receiving order mode (step S56), a quantity of receiving order b is received (step S57), and output to the corresponding apparel manufacturer 10 and the textile company 20 (step S58). Then, a total quantity Y of receiving order of the textile is read from the textile receiving and issuing order DB 535C (step S59). Next, the receiving order b is added to the total quantity Y, the result is used as a new total quantity Y of issuing order, and the textile receiving and issuing order DB 535C is renewed (step S60).

In step S26, the transaction result retrieved from the textile receiving and issuing order DB 535C is displayed on the lower portion of the window 14 as shown in FIG. 2. For example, when the textile company 20 inputs the transaction result as general public data α or designated enterprise public data β, a real number can be displayed as shown in FIG. 12. However, in a case where the transaction result is registered as private data γ, the transaction result is displayed as second data in which the transaction result is processed. For example, as shown in FIG. 13, the quantity of receiving and issuing orders can be roughly displayed. Also, as shown in FIG. 14, the transaction result for the past several months can be displayed by a graph.

FIG. 15 is a flow chart showing a retrieval operation of the textile receiving and issuing order DB 535C in step S26 so as to carry out the display as shown in FIG. 13. More specifically, a past total quantity X of issuing order is retrieved from the textile receiving and issuing order DB 535C (step S71). If the security level set to the textile is a level of general public data α (step S72), the operation goes to step S27 of FIG. 10A, and the retrieved total quantity X of issuing order is output. If the security level is designated enterprise public data β (step S73), it is discriminated whether or not the retrieved total quantity X of issuing order is a predetermined quantity α (e.g., 10,000) or more by the data service company 50 (step S75). If it is YES, data for displaying "Large" is generated (step S76). Then, the operation goes to step S27, and data for displaying "Large" is output. If the total quantity X of issuing order is the quantity β (e.g., 1,000) or more (step S77), data for displaying "Intermediate" is generated (step S78). If the total quantity X is other than the above value, data for displaying "Small" is generated (step S79), and such data is output in step S27.

The display of the quantity of receiving order can be carried in the same operation. Also, the retrieval processing in step S34 can be carried out in the same operation.

Figure 16:
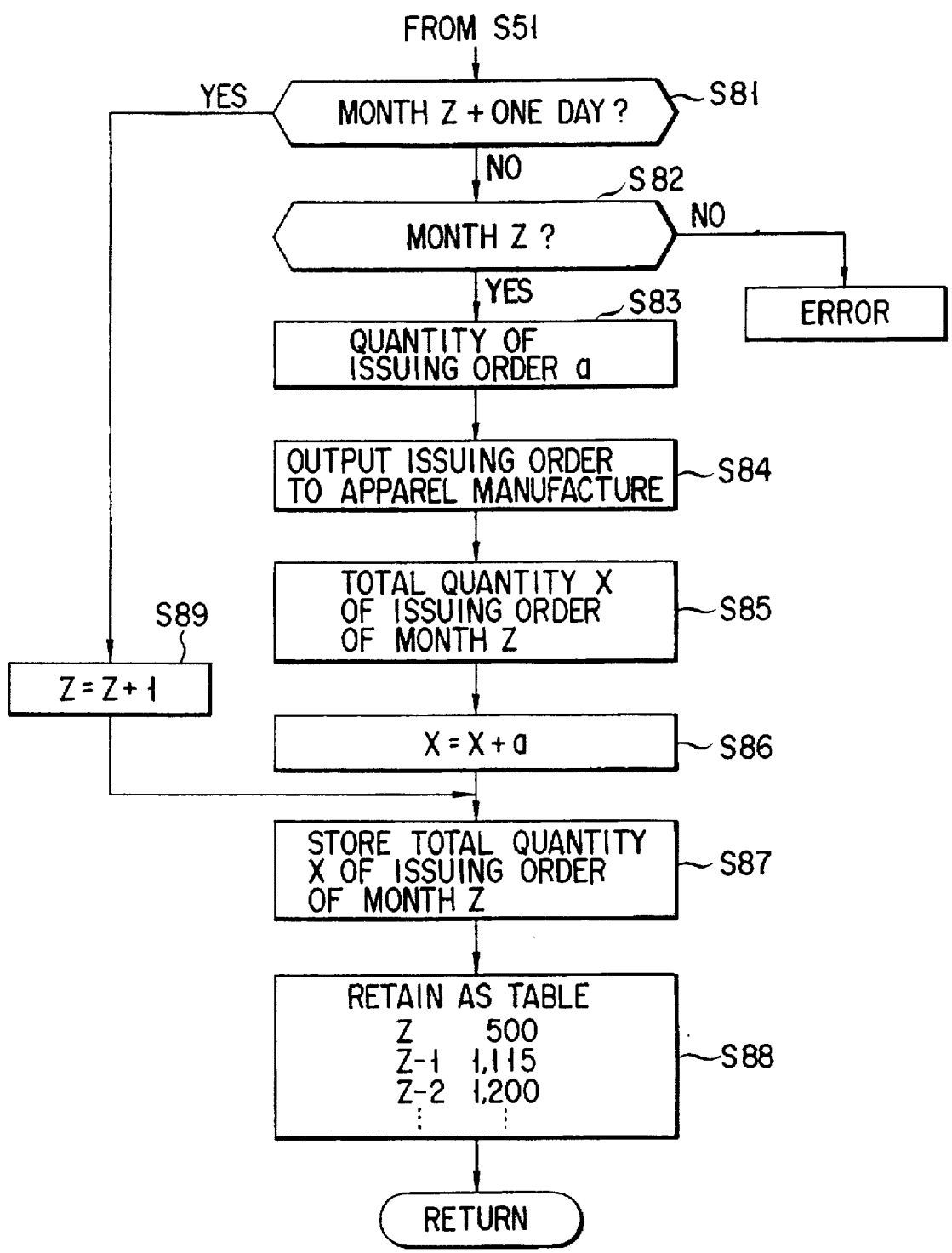
FIG. 16 is a flow chart showing a changed portion of the flow chart of FIG. 11 to perform the display of FIG. 14.

In order to obtain the display shown in FIG. 14, the steps S52 to 55 are changed as shown in FIG. 16. More specifically, it is discriminated whether or not it is month Z (this month)+one day, that is, next month (step S81). If it is month Z (step S82), quantity a of issuing order is received from the apparel manufacturer 10 via data service company 50 (step S83). Then, the quantity a of issuing order is output to the apparel manufacturer 10, which is the origin of the issue, for confirmation (step S84). Next, a total quantity X of issuing order of the corresponding textile of month Z is read from the textile receiving and issuing order DB 535C (step S85), the issuing order a is added to the total quantity X, and a new total quantity X of issuing order is calculated (step S86). Then, the total quantity X of issuing order of month Z is stored in the textile receiving and issuing order DB 535C (step S87). Moreover, the total quantity X of issuing order of month Z in a table structured in the textile receiving and issuing order DB 535C is renewed (step S88).

If it is the next month (step S81), a value of Z is renewed (step S89). The renewed total quantity X of month Z, that is, "0" is stored in the textile receiving and issuing order DB 535C (step S87). Moreover, the total quantity X of issuing order of month Z in the table structured in the textile receiving and issuing order DB 535C is renewed (step S88).

In this case, the retrieval processing in steps S26 and S34 is carried out as shown in the flow chart of FIG. 17.

More specifically, in a case where the security level corresponding to the retrieved textile is retrieved from the textile receiving and issuing order DB 535C and the retrieved security level is a (step S91), the total quantity X of issuing order is retrieved (step S92). Then, the operation goes to step S27 of FIG. 10, and the retrieved total quantity X of issuing order is output. In a case where the security level is designated enterprise public data β (step S93), it is discriminated by the ID number whether or not the enterprise (company), which has designated the retrieval, is the designated enterprise (step S94). Then, if it is YES, the operation goes to step S92.

On the other hand, if it is NO or the security level is private data γ, the table structured in the textile receiving and issuing order DB 535C is retrieved (step S95). Then, the operation goes to step S27, and the retrieval result is output.

As mentioned above, designated enterprise public data β and private data γ are processed to second data, and second data is offered to the enterprise (subscriber) which requires the retrieval, so that the security can be maintained.

In view of the security, it is also required that leakage be prevented at the time of data communication between the data service company 50 and each company (subscriber). To attain the above object, various types of cipher systems such as a public key system, a key predistribution system (KPS) etc. can be used. The public key system is that a data transmitter ciphers a communication text by use of a public key, which is open to public, transmits the ciphered communication text to a receiver, and the receiver, which has a secret key corresponding to the public key, decodes the ciphered text by his secret key. KPS is that the management center inputs a proper function in an IC card and delivers it to the subscriber, and the subscriber can obtain a key common to an opponent by inputting a name of the opponent (ID) into the function if the subscriber wishes to carry out a cipher communication.

Moreover, if data to be stored in the integrated DB 53 is ciphered itself, the security can be further improved.

In the above embodiment, data of the textile was explained as one example in order to simplify the explanation. It is of course possible that other processing data such as receiving and issuing order of dresses can be also realized.

Moreover, in the above embodiment, all textile data was designed to be provided in the host computer 52 of the data service company 50. However, data may be provided in each company as a dispersion type.

The following will explain a second embodiment of the present invention as the dispersion type.

In order to simplify the explanation, this embodiment will explain only a case of textile data, and other cases will be omitted. It is of course possible that other processing data such as receiving and issuing order of dresses can be also realized.

Figure 18B:
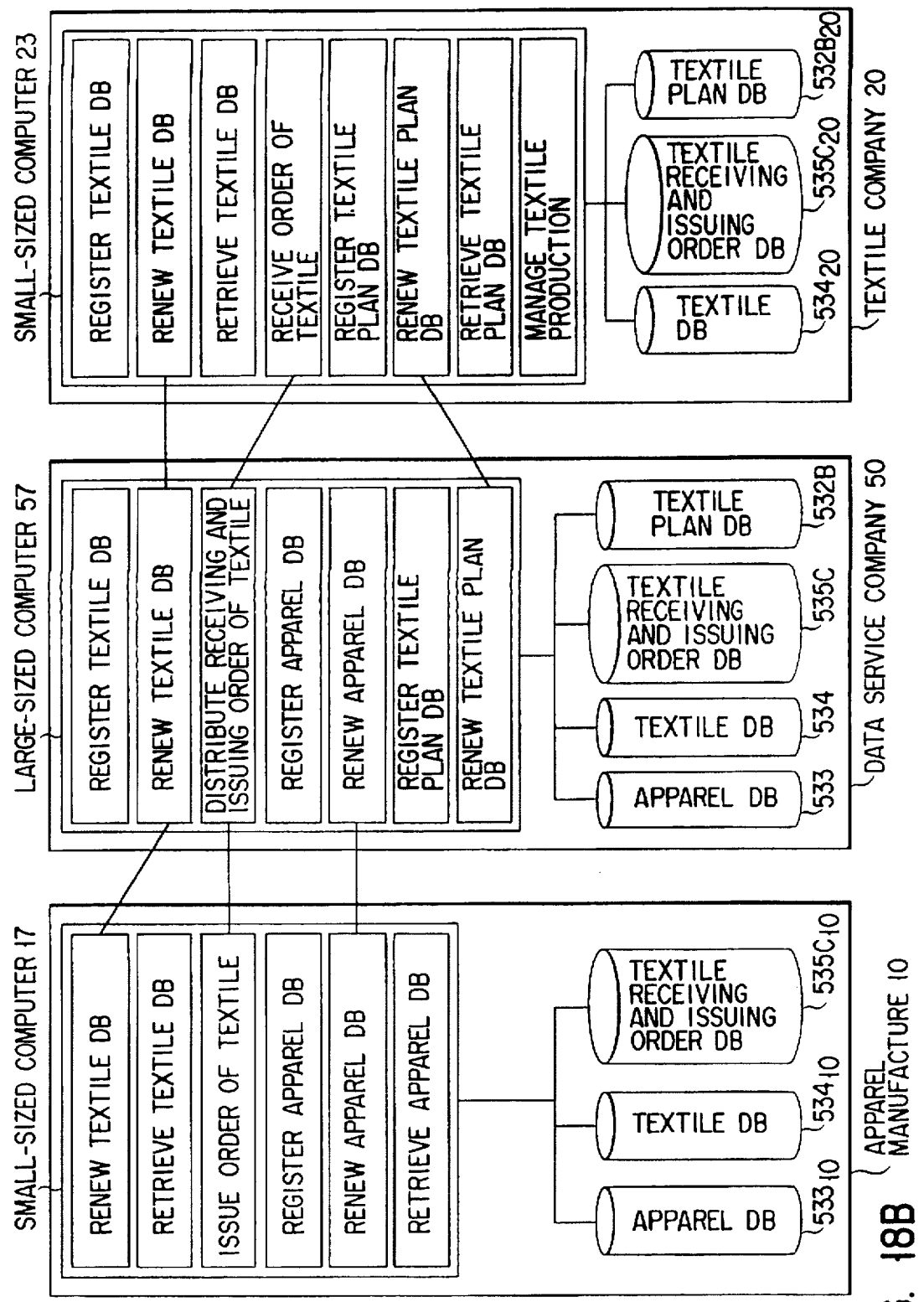

FIGS. 18A and 18B are views showing the structure of the second embodiment.

The textile transaction is performed between the apparel manufacturer 10 and the textile company 20 online. Small-sized computers 17 and 23 are provided in the each apparel manufacturer 10 and textile company 20 so as to process data of receiving and issuing the textile. A large-sized computer 57 of the data service company 50 is provided between a plurality of apparel manufacturers 10 and a plurality of textile companies 20 in order to perform the transactions between the plurality of apparel manufacturers 10 and the plurality of textile companies 20. The large-sized computer 57 manages the selling textiles of the plurality of companies in one database, and performs a distribution process of data of textile receiving and issuing order so as to smoothly carry out the textile receiving and issuing order. In this case, the distribution process can be explained as follows.

That is, in a case where the apparel manufacturer 10 issues an order of textiles of a plurality of item numbers and the order of textiles extends to the plurality of textile companies, data of textile issuing order is distributed to each textile company 20.

In the machine of each apparel manufacturer 10, there are provided a textile DB $534_{10}$ having a function as a catalogue of the textiles to transacted, a textile receiving and issuing order DB $535C_{10}$ related to the textiles in the textile DB $534_{10}$, and an apparel DB $533_{10}$ (apparel design DB $533A_{10}$) for simulating superimposition of the apparel design textile in selecting the textile. These databases DBs $534_{10}$, $535C_{10}$ and $533_{10}$ correspond to DBs 534, 535C and 533 of the data service company 50, respectively, and data addition and maintenance are performed through the online transmission from the data service company 50 as required. However, regarding the textile design DB having a large capacity of data in the textile DB $534_{10}$, data addition and maintenance may be performed in an off-line manner by use of a periodical distribution of data stored in such as an optical disk.

On the other hand, in the machine of each textile company 20, there are provided a textile DB $534_{20}$ having data of the textiles, self-company offers in the network, textile receiving and issuing order DB $535C_{20}$ related to the textiles, a textile plan DB $532B_{20}$ including processed data of each textile.

In the machine of data service company 50, there are provided the textile DB 534 registering the textiles to be sold by all textile companies participating in the network and the receiving and issuing order DB 535C for each textile. These data are serviced to each apparel manufacturer 10 as required. Moreover, the apparel design registered in each apparel manufacturer 10 is formed as the apparel database 533. Also, there is provided the textile plan DB 532B including processed data, which is not offered to the apparel manufacturer 10.

FIG. 19 shows a retrieval screen 18, which is used when the textile is selected by the machine of the apparel manufacturer 10. An image 18A of the textile and its attribute character data 18B, and transaction result data 18C of the displayed textile are displayed in one screen 18. Moreover, in order to select the textile, the apparel design is selected from the apparel design DBs $533_{10}$ and 533 10 and a simulation of superimposing the selected design on the textile may be performed.

Figure 20:
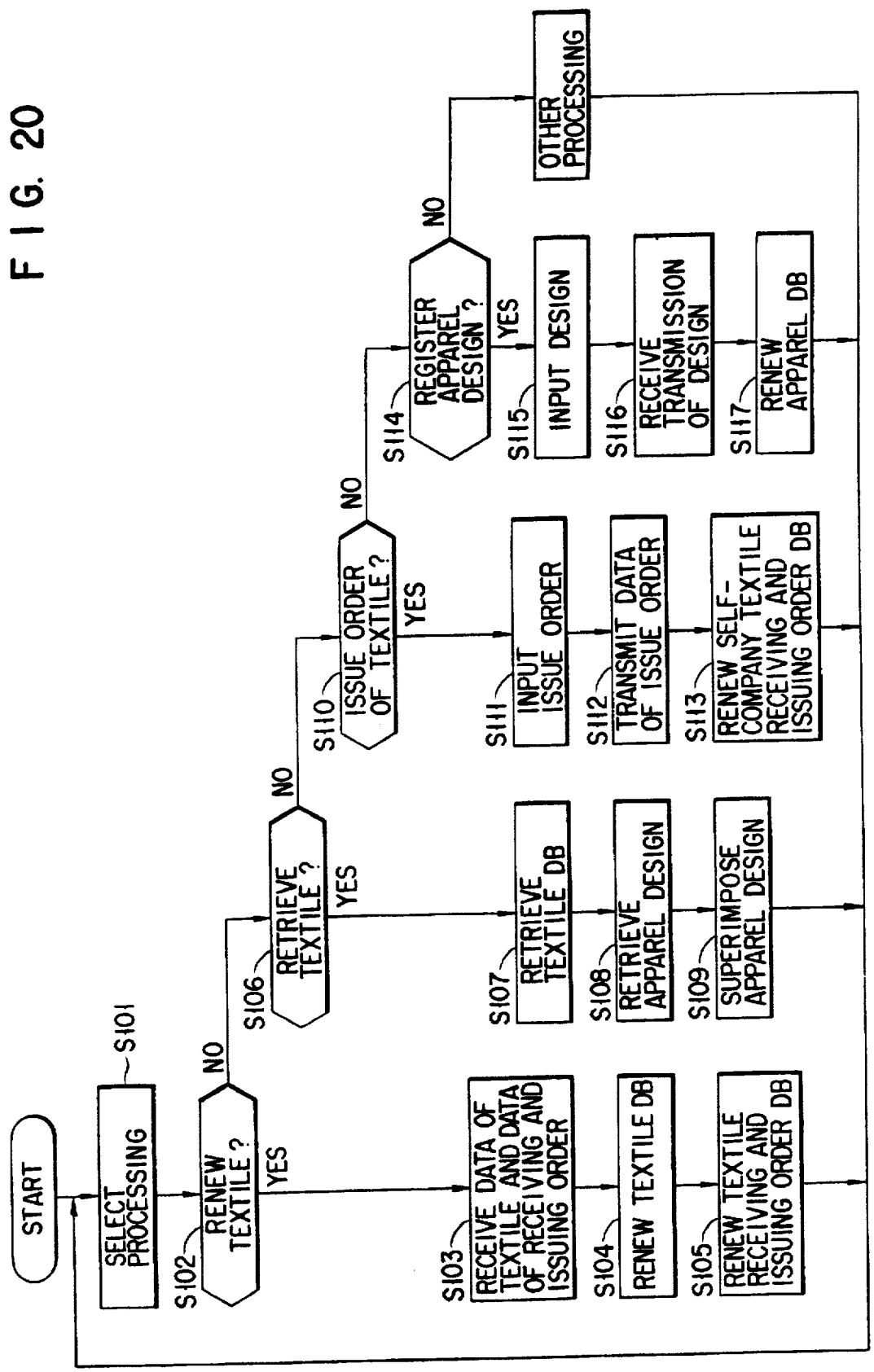
FIG. 20 is a flow chart showing a data processing by the apparel manufacturer according to the second embodiment.

FIG. 20 is a flow chart showing a data processing by the apparel manufacturer 10.

More specifically, if a certain process is selected by the apparel manufacturer 10 (step S101) and the selected process is a renewal process of DB of the textile (step S102), data of the textile DB 534 and the textile receiving and issuing order DB 535C is received from data service company 50 (step S103), and the corresponding DBs $534_{10}$ and $535C_{10}$ in the apparel manufacturer 10 are renewed (steps S104 and S105). The selection of this process may be performed by an operator as required or periodically performed by a timer.

If the operation is a retrieval process for selecting the textile (see FIG. 19) (step S106), a textile is selected from the textile DB $534_{10}$ and the textile receiving and issuing order DB $535C_{10}$ and displayed (step S107). Then, an apparel design is retrieved and selected (step 108), and a simulation of superimposing the selected design on the textile may be performed (step S109).

On the other hand, in the case where the operation is a process for issuing the order of the textile (step S110), an issue order is input (step S111). Then, input data is transmitted to the data service company 50 (step S112) and stored and renewed in the textile receiving and issuing order DB $535C_{10}$ as the transaction result (the remains of the issuing order) of the self-company is stored and renewed (step S113).

In the case that the operation is a registration process of the apparel design (step S114), the apparel design of the self-company is prepared and input (step S115). Input data is transmitted to the data service company 50, and other necessary data is received from the data service company 50 (step S116). Then, receiving and transmitting data is stored and renewed in the apparel DB $533_{10}$ (apparel design DB $533A_{10}$) of the self-company (step S117).

Figure 21:
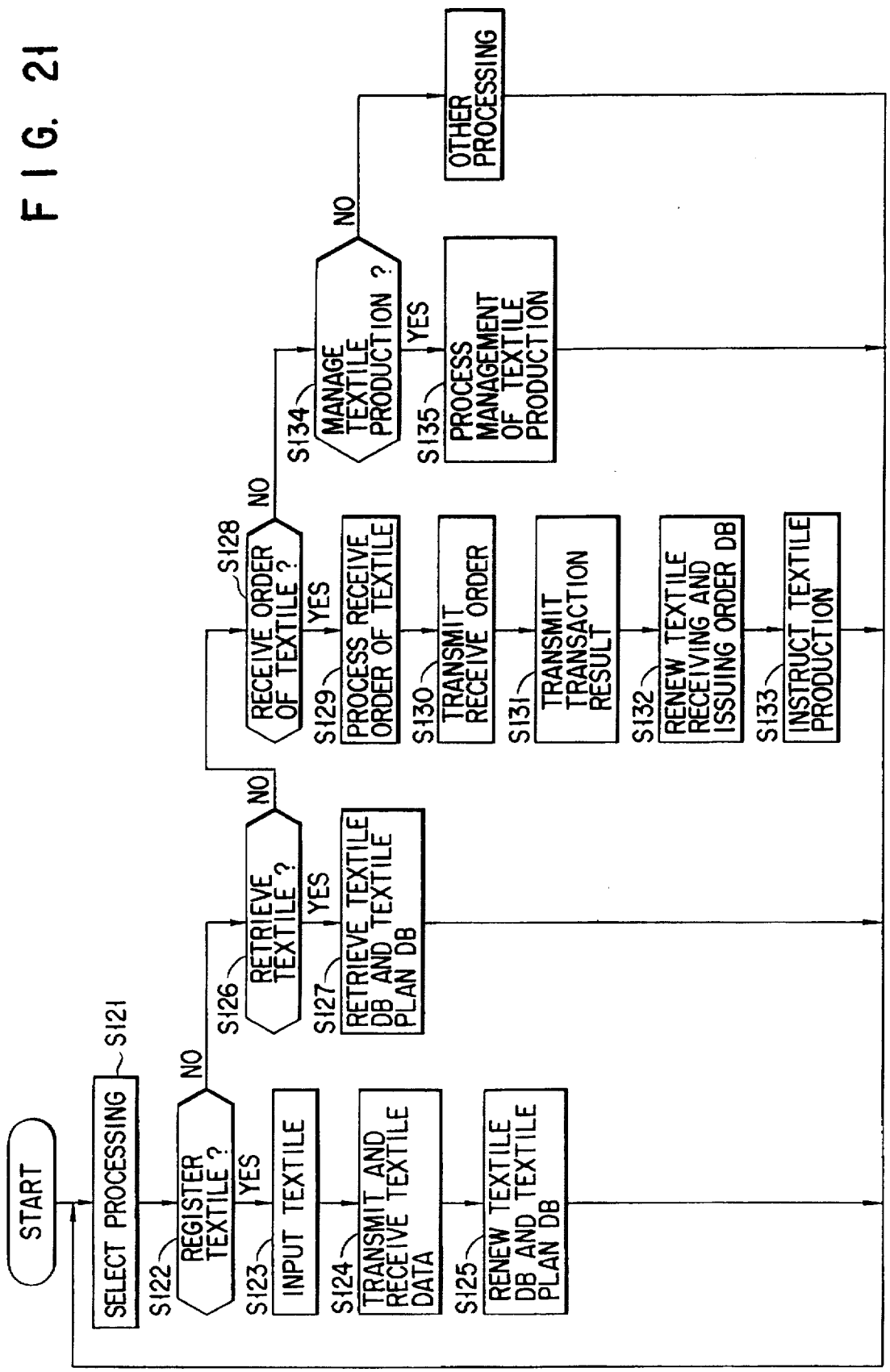
FIG. 21 is a flow chart showing a data processing by a textile company according to the second embodiment.

FIG. 21 is a flow chart showing a data processing by the textile company 20.

More specifically, if a certain process is selected by the textile company 20 (step S121) and the selected process is a registration process of data of the textile, which is to be offered to the network and to be sold (step S122), the textile is input (step S123) and data of textile is transmitted to the data service company 50 (step S124). Then, the textile DB $534_{20}$ of the self-company and the textile plan DB $5323_{20}$ are renewed (step S125).

Moreover, if the operation is a retrieval process of the textile (step S126), the textile DB $534_{20}$ and textile plan DB $532B_{20}$ are retrieved (step S127).

In the case that the operation is a process at the time of receiving the order of the textile (step S128) and data of the textile issuing order is received from the apparel manufacturer 10 (step S129), the input of received data is performed (step S130). Then, data of the transaction result is fetched from the textile receiving and issuing order DB $535C_{20}$, the fetched data is renewed based on data of receiving order, data of a new transaction result is prepared, and the prepared data is transmitted to the data service company 50 (step S131). Also, the textile receiving and issuing order DB $535C_{20}$ of the self-company is renewed to data of the new transaction result (step S132). Moreover, processing data is retrieved from the textile plan DB $532B_{20}$, and the production is instructed to the production companies such as textile dying company 61, yarn company 62, and weaving company 63 with which the textile company makes a contract in accordance with retrieved data (step S133).

Moreover, if the operation is a process for managing the production of the textile (step S134), such a process is carried out (step S135).

Even in the above-mentioned embodiment of the dispersing type, the transaction result is displayed in accordance with the security level as shown in FIGS. 12 to 14. In other words, designated enterprise public data $\beta$ and private data $\gamma$ are processed to be second data, and second data is serviced to the enterprise (subscriber), which needs the retrieval, so that the security can be maintained. Also, the security of the data communication between the data service company 50 and each company (subscriber) is maintained by use of various types of cipher systems such as the public key system and KPS as mentioned above.

As shown in FIG. 2, the window may be overlapped when data is displayed by the apparel manufacturer 10.

In the second embodiment, the textile receiving and issuing order DB 535C of the data service company 50 may have no real data. In other words, as shown in FIG. 22, access to the textile receiving and issuing order DB $535C_{10}$ of the apparel manufacturer and the textile receiving and issuing order DB $535C_{20}$ is provided by data for specifying the apparel manufacturer and the textile company and the item number code C for specifying which textile is used. Thereby, the renewal of the transaction result and the retrieval thereof may be performed. If it is necessary not to provide access to the transaction result of the other competitive companies, the following two types of retrieval methods for ensuring the security can be used.

First, for example, in the renewal and retrieval from the textile company 20, a list of the apparel manufacturers 10, which do business transactions with the corresponding textile company 20, is displayed in the terminal 22 of the corresponding textile company 20. One apparel manufacturer 10 is designated from the listed apparel manufacturers 10. Then, the textile in which is dealt between the apparel manufacturer 10 and the corresponding textile company 20, is designated so that access to only the transaction results between both companies can be provided. Second, the list of the goods number of the textiles of the corresponding company 20 is displayed based on the ID number. One goods is designated from the listed goods. Then, the apparel manufacturer, which deals in the designated textile, is designated so that access to only the transaction results between both companies can be provided.

Moreover, by use of data (textile specification) of the textile receiving and issuing order DB 535C, it is possible to access to data relating to the corresponding textile of the textile plan DB 535B and textile DB 534 (textile design DB 534A and textile goods DB 534B).

Furthermore, by use of the above-mentioned KPS, the security can be maintained without using the ID number and the password. This will be explained as a third embodiment of the present invention as follows.

Figure 23:
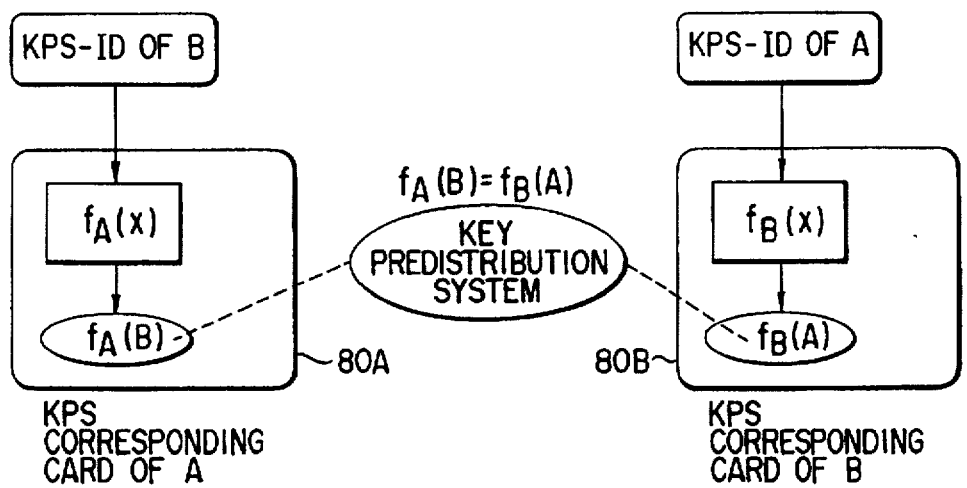
FIG. 23 is a generation type view of a key predistribution in a key predistribution system (KPS)

First, KPS will be briefly explained. KPS is that the management center inputs a proper function in an IC card and delivers it to each subscriber, and the subscriber can obtain a key common to an opponent by inputting a name of the opponent (KPS-ID) into the function if the subscriber wishes to carry out a cipher communication. For example, as shown in FIG. 23, if a function of an IC card 80A to be distributed to a subscriber A is $f_A(X)$, $f_A(B)$ may be calculated when the subscriber A wishes to share the key with a subscriber B. If the subscriber B calculates the function $f_B(A)$ of the self-IC card 80B by use of the function $f_B(X)$, the result is equal to $f_A(B)$ and the same key can be calculated. Such a key calculation can be performed in the IC card. Therefore, the key predistribution can be realized without any communication in advance in the KPS.

Figure 24:
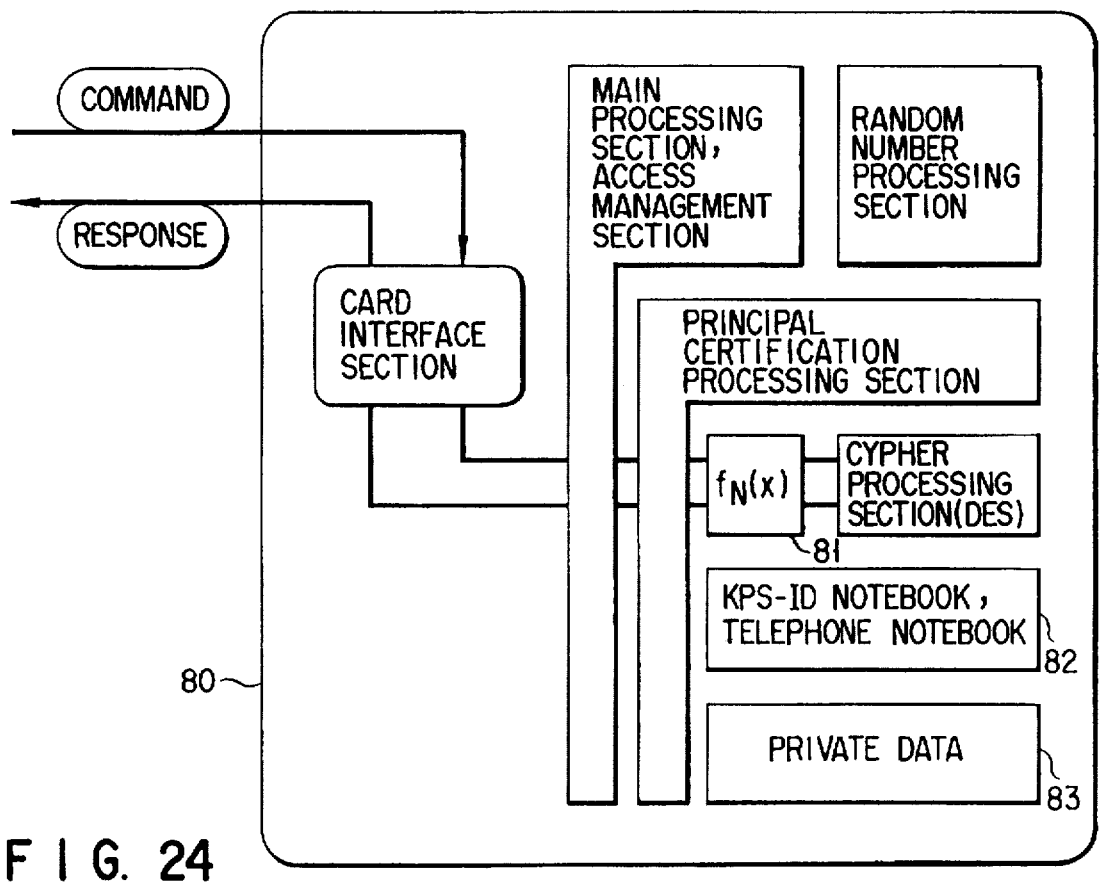
FIG. 24 is a block diagram showing the functions of a KPS card.

The KPS card 80 is based on the standard of the IC card of ISO, is the same size as a credit card, and has the structure as shown in, for example, FIG. 24. A function $f_N(X)$ of a subscriber N, who has the corresponding card 80, is stored in a function storing section 81. Moreover, KPS-ID of the other subscribers can be arbitrarily fixed as in, for example, <name+telephone number of place of work>, and stored in a KPS-ID notebook and a telephone notebook storing section 82. In this embodiment, there is provided a private data storing section 83 for storing private data γ of the subscriber, who has the corresponding card, in the KPS card 80.

In other words, according to this embodiment, such KPS card 80 is distributed to each subscriber (including not only each company but also individual consumer), and ID and telephone number of the data service company 50 are stored in the KPS-ID notebook and the telephone number storing section 82.

Therefore, private data is stored in only the card 80, and it can be structured that the data service company 50 has no private data. The data service company 50 has only second data, which cannot be specified by an individual, and services sharing second data. In other words, since the data service company 50 has no private data, private data is not leaked out of the data service company 50. Moreover, since data flowing on the network flows as a cipher, data is not leaked from the network. This will be explained with reference to the flow chart of FIG. 25 according to the structure of FIG. 1 in the case that an individual consumer as a subscriber purchases a dress at a certain shop 70. In this case, transaction data and individual attribute data are stored in the private data storing section 83 of the card 80, which the individual consumer has. More specifically, transaction data includes the date of purchase, the type of the dress, the number of dresses, and the state of payment, etc., and individual attribute data includes the name of the owner of the corresponding card, the sex, and the address, etc.

If the individual consumer purchases the dress at any one of shops 70, ciphered private data is read from the card 80 by a card reader (not shown) connected to the terminal 72 of the corresponding shop 70, and read private data is transmitted to the data service company 50 through the sales company 40 (step S141). Then, data of the dress, which the consumer purchased, is input by, for example, a bar code reader (not shown) connected to the terminal 72, and such purchase data is transmitted to the data service company 50 (step S142).

The host computer 52 of the data service company 50 receives the above private data and purchase data, decodes private data, and renews private data based on purchase data (step S143). Then, renewed private data is stored in the work DB 537, ciphered and returned to the shop 70, and written in the card 80 (step S144). Moreover, non-private data is generated from renewed private data (step S145), and stored in the work DB 537 as data of unsettlement of accounts (step S146). In this case, non-private data is data in which individual attributions (name, age, sex, type of dress, address, telephone number, etc.,) are erased and the individual cannot be specified.

The card 80 having renewed private data is returned to the owner.

Thereafter, if there is an inquiry input from the terminal 72 of the shop 70 or the terminal 42 of the sales company 40 (steps S147 to S149), necessary data in the corresponding private data is read from the work DB 537 (step S150), and displayed on the terminal from which the inquiry input is carried out (step S151).

If the settlement of accounts is input (steps S147, S148), the corresponding private data in the work DB 537 is erased (step S152). Also, the corresponding non-private data is stored in suitable DB(s) in the integrated DB 53 (step S153). Thereafter, the non-private data in the work DB 537 is erased (step S154).

As mentioned above, the individual important attributions (name, address, telephone number, etc.,) are erased when registering in the suitable DB(s) in the integrated DB 53. By use of the above system, customer data can be shared as collective data in the network even if the customer purchases the dress at any boutiques (shop). At the stage of the unsettlement of accounts, it is needed that private purchase data remain for inquiry. However, after the settlement of accounts is ended, such data is erased. In other words, if the customer purchases the dress, private purchase data and non-private purchase data having no name and address are generated. At the stage of the unsettlement of accounts, non-private purchase data is masked, and the host computer (integrated data base management system) 52 allows only private purchase data to be read, and access to private purchase data to be provided to only the company having the business transaction. After the settlement of accounts, private purchase data is erased, and non-private purchase data is stored in the integrated DB. The non-private purchase data can be used by anyone participating in the network. Therefore, the data service company 50 and each of the companies participating in the network can effectively manage the customers without having unnecessary private data.

The third embodiment explained the case of purchasing the dress in order to simplify the explanation. However, the other processing such as receiving and issuing order of the textile or the dress can be, of course, realized in the similar manner.

As mentioned above, according to the present invention, in the open system in which an unspecified number of subscribers participate, secret data of the specific subscriber can not be leaked to the other subscribers. Therefore, since the problem of security in constructing the open system can be solved, there can be constructed the open system in which the network between the plurality of apparel manufacturers and the plurality of textile companies, and the network between the weaving companies, which are the relating companies of the apparel manufacturers, and the sales companies can be constructed, and not only the database of the self-company but also that of the other companies can be mutually used. Therefore, as compared with the conventional plan and product of the textiles, which largely depend on the person's ready insight and experience, the various types of items and the small quantity of production, and the repeated order can be performed based on data. In other words, since textile data of every item of different companies and the sequentially renewed transaction result of textile data can be retrieved, the receiving and issuing order of the textile matching with the latest trend in clothes can be timely and quickly carried out. Since issuing order can be timely carried out, the various types of items and the small quantity of production can be quickly made. Moreover, processed data is provided to textile data, so that the quick production can be performed.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An open system comprising:

database means in which original data offered by a large number of subscribers is stored;

said original data being obtained from a transaction by subscribers in a network which the subscribers join, said original data including information;

second data generating means for generating second data whose data source cannot be specified and which is available to all subscribers of the network by processing said original data offered by said large number of subscribers, said second data including only a part of said information of said original data and in a different form from said original data;

said second data generating means including:

means for processing the original data obtained from the transaction in the network of the subscribers so as to transform numerical information in the original data into said second data which is in categories respectively corresponding to predetermined ranges of said numerical information; and means for storing said second data in said database;

access means for accessing said second data stored in said database means by each subscriber; and determining means for determining whether said original data or said second data should be displayed, on the basis of a security level of the data and the subscriber attempting to access said second data, so as to selectively limit information displayed to certain subscribers to only said second data.

2. The open system according to claim 6, further comprising:

means for generating third data available to all subscribers by processing said second data by use of commonly available general data, and for storing said third data in said database means.

3. The open system according to claim 2, wherein said means for generating said third data adds said commonly available general data to said second data so as to generate said third data.

4. The open system according to claim 1, wherein said second data generating means further includes:

first data storing means for receiving said original data from any one of the subscribers, and for temporarily storing said received data in said database means as first data;

second data storing means for generating second data in which data specifying said subscriber is deleted from said first data, and for storing said second data in said database means;

subscriber specifying means for specifying a subscriber trying to obtain access to said database means by said access means;

monitoring means for monitoring whether or not an account for a transaction among subscribers is settled;

subscriber limiting means for limiting a subscriber who can obtain access to said first data stored in said database means by said access means based on the subscriber specified by said subscriber specifying means before said account is settled; and first data erasing means for erasing said first data stored in said database means after said account is settled.

5. The open system according to claim 4, further comprising:

second data access prohibiting means for prohibiting access to said second data stored in said database from being provided by said access means until after said account is settled.

6. An open system comprising:

database means in which data offered by a large number of subscribers is stored;

private data storing means for receiving data from any one of the subscribers, and for temporarily storing said received data in said database means as private data which includes numerical information;

non-private data generating and storing means for:

generating non-private data in which data specifying said subscriber is deleted from said private data and in which said non-private data includes only a part of said information of said private data and is in a form of categories respectively corresponding to predetermined ranges of said numerical information, and storing said non-private data in said database means;

access means for providing access to said database means by each subscriber;

subscriber specifying means for specifying a subscriber trying to obtain access to said database means by said access means;

monitoring means for monitoring whether or not an account for transaction among subscribers is settled;

subscriber limiting means for limiting a subscriber who can obtain access to said private data stored in said database means by said access means based on the subscriber specified by said subscriber specifying means before said account is settled; and private data erasing means for erasing said private data stored in said database means after said account is settled.

7. The open system according to claim 6, further comprising:

non-private data access prohibiting means for prohibiting access to said non-private data stored in said database means from being provided by said access means until after said account is settled.

8. The open system according to claim 6, further comprising:

an IC card distributed to each subscriber, and wherein data to be sent from said subscriber to said private data storing means, is data stored in said IC card distributed to said subscriber.

9. The open system according to claim 8, wherein said private data storing means includes:

data receiving means for receiving data from said IC card;

renewal data input means for inputting renewal data;

data renewal means for renewing data received by said data receiving means based on said renewal data input by said renewal data input means;

means for renewing data, which has been renewed by said data renewal means, in said IC card by returning renewed data to said IC card and for storing the returned renewed data in said IC card; and storing means for temporarily storing data renewed by said data renewal means in said database means as said private data.

10. The open system according to claim 9, wherein:

data stored in said IC card includes attribute data of an owner of said IC card and data of business results for past years; and renewal data input by said renewal data input means includes business data in accordance with a purchase of a new item.

11. An open system comprising:

database means in which original data offered by a large number of subscribers is stored;

said original data being obtained from a transaction by subscribers in a network which the subscribers join, said original data including numerical information;

second data generating means for generating second data whose data source cannot be specified and which is available to all subscribers of the network by processing said original data offered by said large number of subscribers, said second data including only a part of said information of said original data and in a different form from said original data;

said second data generating means including:
means for processing the original data obtained from the transaction in the network of the subscribers so as to transform said numerical information in the original data into said second data which approximates said original data; and means for storing said second data in said database;

access means for accessing said second data stored in said database means by each subscriber; and determining means for determining whether said original data or said second data should be displayed, on the basis of a security level of the data and the subscriber attempting to access said second data, so as to selectively limit information displayed to certain subscribers to only said second data.

12. An open system comprising:

database means in which data offered by a large number of subscribers is stored;

private data storing means for receiving data from any one of the subscribers, and for temporarily storing said received data in said database means as private data which includes numerical information;

non-private data generating and storing means for:
generating non-private data in which data specifying said subscriber is deleted from said private data and in which said non-private data approximates said numerical information of said private data, and storing said non-private data in said database means;

access means for providing access to said database means by each subscriber;

subscriber specifying means for specifying a subscriber trying to obtain access to said database means by said access means;

monitoring means for monitoring whether or not an account for transaction among subscribers is settled;

subscriber limiting means for limiting a subscriber who can obtain access to said private data stored in said database means by said access means based on the subscriber specified by said subscriber specifying means before said account is settled; and private data erasing means for erasing said private data stored in said database means after said account is settled.

13. An open system comprising:

database means in which original data offered by a large number of subscribers is stored;

said original data being obtained from a transaction by subscribers in a network which the subscribers join, said original data including information in other than graph form;

second data generating means for generating second data whose data source cannot be specified and which is available to all subscribers of the network by processing said original data offered by said large number of subscribers, said second data being in graph form and including only a part of said information of said original data;

said second data generating means including:
means for processing the original data obtained from the transaction in the network of the subscribers so as to transform the original data into said second data in graph form; and means for storing said second data in said database;

access means for accessing said second data stored in said database means by each subscriber; and determining means for determining whether said original data or said second data should be displayed, on the basis of a security level of the data and the subscriber attempting to access said second data, so as to selectively limit information displayed to certain subscribers to only said part of said information of said second data in said graph form.

14. An open system comprising:

database means in which data offered by a large number of subscribers is stored;

private data storing means for receiving data from any one of the subscribers, and for temporarily storing said received data in said database means as private data including information in other than graph form;

non-private data generating and storing means for:
generating non-private data in which data specifying said subscriber is deleted from said private data, and in which said non-private data is in graph form and includes only a part of said information of said private data, and storing said non-private data in said database means;

access means for providing access to said database means by each subscriber;

subscriber specifying means for specifying a subscriber trying to obtain access to said database means by said access means;

monitoring means for monitoring whether or not an account for transaction among subscribers is settled;

subscriber limiting means for limiting a subscriber who can obtain access to said private data stored in said database means by said access means based on the subscriber specified by said subscriber specifying means before said account is settled; and private data erasing means for erasing said private data stored in said database means after said account is settled.

* * * * *